US005501385A

United States Patent [19]
Halpin

[11] Patent Number: 5,501,385
[45] Date of Patent: Mar. 26, 1996

[54] LARGE CORE FIBER OPTIC CLEAVER

[75] Inventor: John M. Halpin, Livermore, Calif.

[73] Assignee: The United States of America as represented by the United States Department of Energy, Washington, D.C.

[21] Appl. No.: 351,915

[22] Filed: Dec. 8, 1994

[51] Int. Cl.[6] .................................................. C03B 37/16
[52] U.S. Cl. ............................................. 225/96; 83/879
[58] Field of Search ........................ 83/879, 880; 225/96, 225/96.5, 94, 93

[56] References Cited

U.S. PATENT DOCUMENTS

| | | | |
|---|---|---|---|
| 2,389,376 | 11/1945 | Mandin | 83/587 |
| 3,934,773 | 1/1976 | Chinnock et al. | 225/96.5 |
| 4,036,419 | 7/1977 | Hensel et al. | 83/879 |
| 4,216,004 | 8/1980 | Brehm et al. | 225/96.5 |
| 4,474,319 | 10/1984 | Walker | 225/96 |
| 4,627,561 | 12/1986 | Balyasny et al. | 225/96 |
| 4,644,647 | 2/1987 | Szostak et al. | 83/879 |
| 4,667,862 | 5/1987 | Millar et al. | 225/96 |

*Primary Examiner*—Kenneth E. Peterson
*Attorney, Agent, or Firm*—Miguel A. Valdes; William C. Daubenspeck; William R. Moser

[57] ABSTRACT

The present invention relates to a device and method for cleaving optical fibers which yields cleaved optical fiber ends possessing high damage threshold surfaces. The device can be used to cleave optical fibers with core diameters greater than 400 μm.

2 Claims, 19 Drawing Sheets

LARGE CORE FIBER OPTIC CLEAVER

GOVERNMENT RIGHTS

The United States Government has rights in this invention pursuant to Contract No. W-7405-ENG-48 between the United States Department of Energy and the University of California.

FIELD OF THE INVENTION

The present invention relates to a device and method for cleaving optical fibers. More specifically, the present invention relates to a device and method for cleaving optical fibers with core diameters equal to or greater than 400 μm.

BACKGROUND OF THE INVENTION

Optical fibers are used in a wide range of applications as a medium for delivering laser light energy to destinations remote from the light source. Perhaps the most common use for fiber optics is in telecommunications. Until recently, most optical fiber applications required the transmission of relatively low power. For example, the light power transmitted in telecommunication applications is generally 0.010 W. At present, there is a growing need to transmit higher amounts of power through optical fibers. For example, the transmission of high power laser light is required in many medical laser applications, in electronically safe firing mechanisms for triggering explosives, for use in the optical triggering of spark gaps, in high-powered optical sensors and in the remote generation of shock waves in materials. These applications generally require the transmission of >10 W of power through the optical fiber.

The amount of power that can be transmitted by an optical fiber is primarily a function of the fiber's cross-sectional area. An optical fiber has a cross-sectional area of $\pi d^2/4$. Thus, the power handling capability of a fiber is related to the square of the fiber diameter (d) or core size. For example, a 400 μm core-fiber should theoretically transmit 16 times as much power as a 100 μm core-fiber. Thus, as the use of high powered laser light applications grows, the utilization of large core fibers will increase in importance.

Independent of the size of the fiber employed, the amount of power that can be transmitted by an optical fiber is primarily limited by the quality of the input and exit faces of the fiber. Irregularities in the fiber faces and subsurface defects in the fiber can cause the scattering of laser light within the fiber resulting in damage to the fiber. Thus, the amount of power that can be transmitted through a fiber can be enhanced by minimizing the number of surface irregularities and subsurface defects present in the fiber.

High quality fiber faces can be achieved either by cleaving the optical fiber or by polishing the optical fiber face. Before cleaving or polishing the fiber, the jacket and buffer materials on the fiber are removed from the fiber end. The bared fiber is then cleaned to prevent later contamination of the cleaved or polished fiber face.

Polishing is one method for preparing fibers with high quality fiber face surfaces. In order to polish a fiber, the fiber is first mounted to a connecter by either an adhesive or by crimping. The fiber is then cut or cleaved close to the connector to minimize the amount of material that must be removed. The connector is then inserted into a holding fixture which holds the connector tight and perpendicular to the polishing or lapping surface. The fiber is first polished with a course grit lapping paper, (30 micron grit), with which the fiber is ground until it is almost flush with the connector. Grinding can be accomplished by hand, by drawing the fixture across the lapping surface in a figure eight pattern, or by using a rotary polishing wheel. Polishing is continued with incrementally smaller lapping grit papers until a mirror finish is achieved with 0.3 to 0.1 micron grit paper.

Polishing is an inefficient means for achieving high quality fiber face surfaces. Polishing is time consuming, taking roughly one hour per connector. Polishing is also labor intensive and generally requires the use of trained polishers. Polishing must also be performed with care to prevent the formation of subsurface defects in the fiber. The lapping compounds or films used also increase the cost of preparing a fiber end.

The quality of a polished fiber face can be quantitatively evaluated according to its damage threshold. The damage threshold of a fiber corresponds to the ability of the fiber end surface to withstand laser power densities at or near the damage threshold of the bulk material. The damage threshold of bulk material has been estimated at $2.4 \times 10^5$ W/cm$^2$ average power and $5.0 \times 10^8$ W/cm$^2$ peak power at wavelengths of 512 and 578 nm. However, it is noted that the damage threshold varies between fibers depending on the presence of impurities, the OH$^-$ content of the glass, the wavelength of the laser as well as a variety of other variables. High damage threshold surfaces are surfaces enabling power to be transmitted through the fiber at levels near the damage threshold of the fiber.

While high damage threshold surfaces can be achieved by carefully polishing the fiber face, it is generally the case that properly cleaved fibers produce fiber faces with higher damage thresholds. Cleaving results in fewer subsurface defects and does not lead to contamination of the fiber face by the lapping compounds. Therefore, cleaving of optical fibers is preferred over polishing as a method for generating high quality fiber face surfaces.

Optical fibers are generally cleaved by first scribing the fiber using a suitable scribing means which is commonly made of tungsten carbide or diamond. Scribing consists of placing the sharp edge of the scribing means at the desired cleavage point, holding the scribing means perpendicular to the fiber and gently drawing the scriber across the fiber. If desired, the fiber can be scribed around the full diameter of the fiber. The small scratch created by the scriber disrupts the molecular bonds of the glass and provides a starting point from which the glass will fracture.

Once the fiber has been scribed, the fiber is most commonly cleaved through the application of tension along the length of the fiber. Fibers smaller than 200 μm in diameter can be cleaved by hand with good quality cleaves. However, fibers greater than 200 μm in diameter require more tension and are sensitive to the alignment of the pull. Thus, more rigid tensioning methods are needed to achieve high quality cleaves for fibers having diameters in excess of 200 μm.

In addition to applying tension to the scribed fiber by tension forces, several devices have been developed that apply torque forces at the scribed point on the fiber instead of tension forces. U.S. Pat. No. 3,934,773; Great Britain Patent No. 2021094; Danish Patent No. 3126852; Danish Patent No. 30135645; Danish Patent No. 2631678; Japanese Patent No. 57/178203; Japanese Patent No. 57/108802; Japanese Patent No. 57/8504. Japanese Patent No. 57/24903 espouses the combined use of tension forces with torque forces to cause fiber fracture. A variation of this device is also put forth wherein the fiber is scribed after tension is first applied. L. C. Mandigo (1979) "Fibre-Optic Cutting Tool," *IBM Technical Disclosure Bulletin,* 22:5 1787; GB 2118539.

Optical fibers have also been cleaved by spark erosion and by thermal shock. See Optical Fibres, Chapter II, "Fiber End Preparation", (Geisler, Beaven and Boutruche, eds.) Weaton & Co., Ltd., Great Britain p. 190 (1986) and references cited therein.

It is important to note that the above disclosed devices for cleaving optical fibers have not been applied to fibers with core diameters greater than 400 µm. Cleaving of fibers greater than 400 µm requires that the scribing means and the tensioning means be very precisely aligned. To date, no cleaving device has been produced that can be adequately aligned so as to enable the satisfactory cleaving of fibers larger than 400 µm.

At present, a simple, quick and inexpensive device and method for cleaving optical fibers greater than 400 µm is needed.

SUMMARY OF THE INVENTION

The present invention relates to a device for cleaving optical fibers with core diameters equal to or greater than 400 µm that yields cleaved optical fiber ends with high quality faces.

The present invention also relates to a method for cleaving optical fibers with core diameters equal to or greater than 400 µm using the claimed device wherein the cleaved fiber possess high quality faces.

BRIEF DESCRIPTION OF THE FIGURES

The invention will be better understood by reference to the appended Figures, of which:

FIGS. 9A–9D illustrate the alignment of an optical fiber along the vertical and rotational axes, wherein FIG. 9A illustrates the viewing angle for alignment of the fiber 122 to the chuck "V" groove 113, FIG. 9B illustrates a vertical mis-alignment, FIG. 9C illustrates a rotational misalignment of the fiber to the "V" groove, and FIG. 9D illustrates proper alignment of the fiber to the "V" groove;

FIG. 10A illustrates an "X" axis misalignment of the fiber ends. FIG. 10B illustrates a proper "X" axis alignment of the fiber ends;

DETAILED DESCRIPTION OF THE INVENTION

The present invention provides a device and method for the cleaving of optical fibers with core diameters equal to or greater than 400 µm wherein the cleaved fibers possess high quality faces. The presently claimed device enables the quality cleaving of fibers greater than 400 µm in size at significantly reduced costs and in significantly less time than is possible by polishing.

Figure 1:
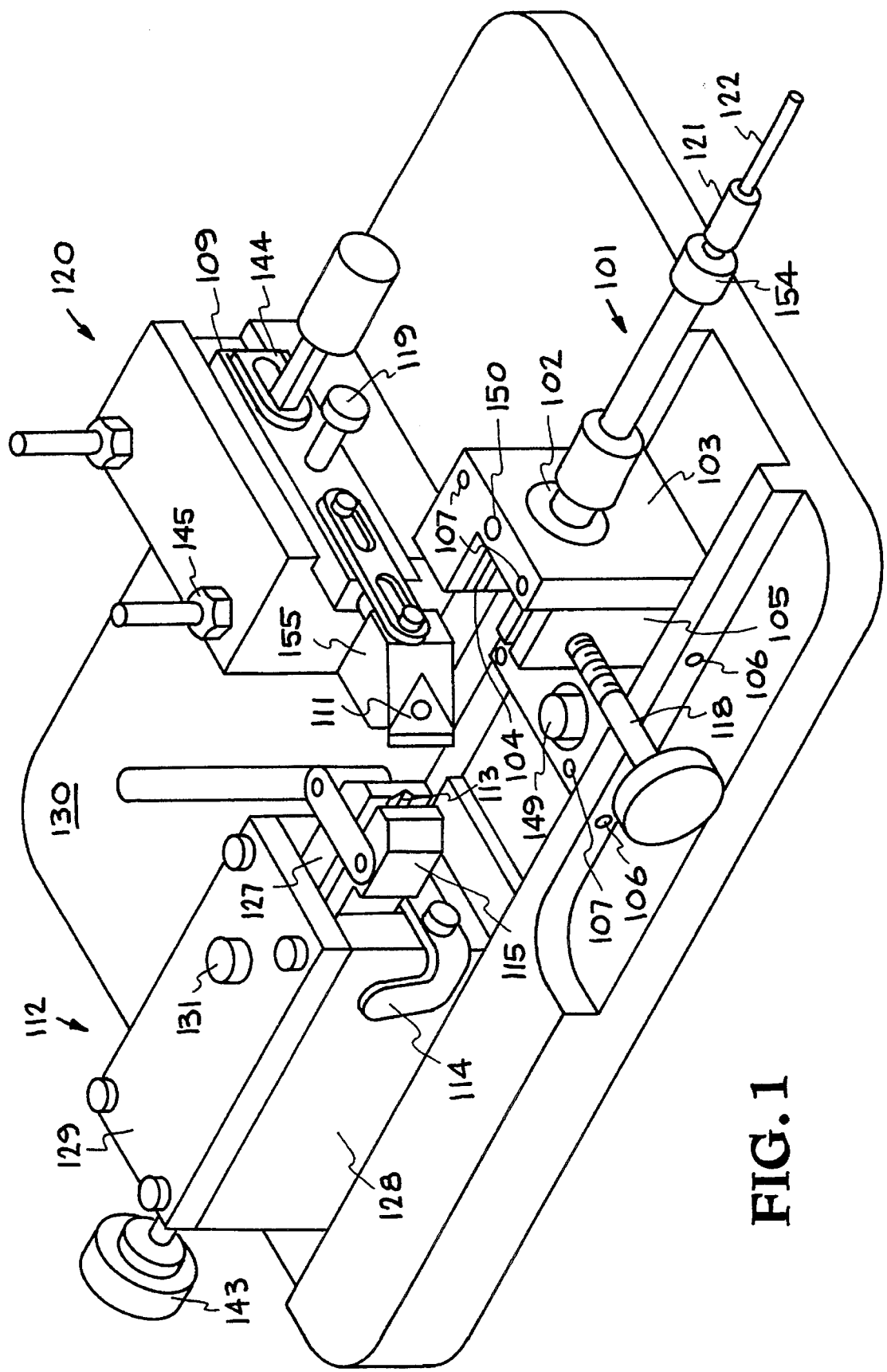
FIG. 1 provides an isometric view of the large core fiber optic cleaver of the present invention.

The device and its use in the production of cleaved optical fiber ends is depicted in FIGS. 1 though 16D. Like numbers are used to designate the same elements in each figure. While the device is described in some instances with regard to specific component sizes and materials, these specific disclosures should not be construed as limiting. Rather, the present invention is intended to encompass all variations of the particular components used that are within the level of ordinary skill in the art.

Figure 12:
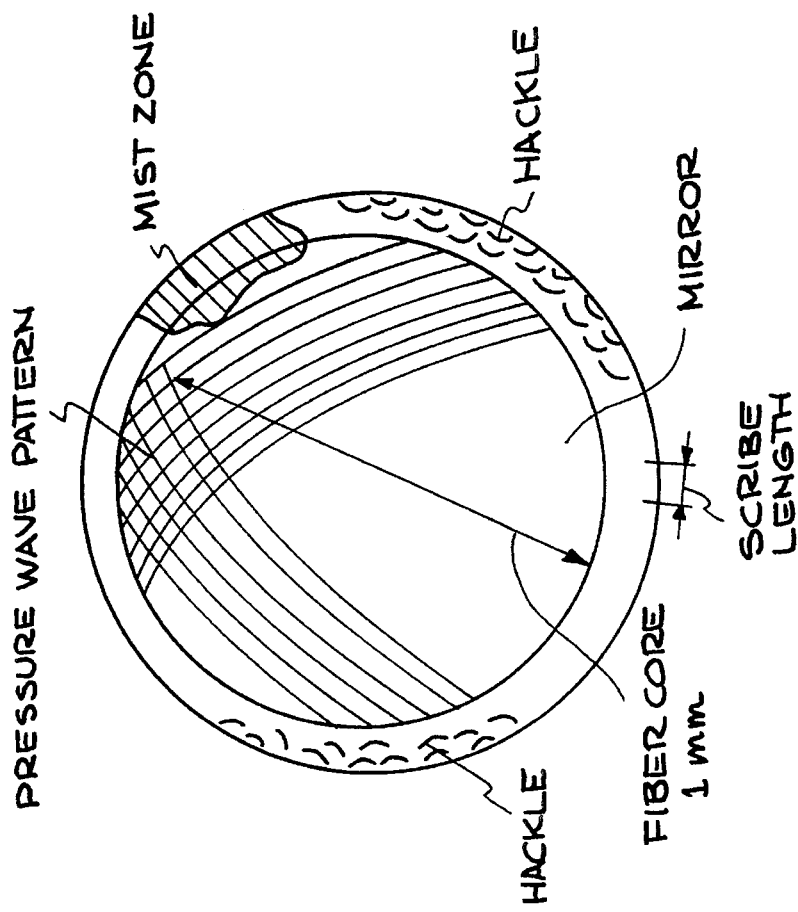
FIG. 12 depicts a typical fiber end face cleaved with the device of the present invention.

In order to provide a clear and consistent understanding of the present invention and claims, including the scope given to such terms, the following definitions relating to the invention are provided:

Hackel refers to the fractured surface area of a cleaved fiber. The Hackel zones depicted in FIG. 12 are typical of fibers cleaved with this device and are caused by the tensional forces applied during cleaving.

Mist is the term used to describe the boundary between the Hackel zones and the mirror surface of the fiber end face mist consists of small hair-line fractures in the surface and is also a product of tensional forces applied during cleaving.

The adjustments implemented in this device are designed to control the tensional forces applied to the fiber during cleaving.

Pressure wave pattern refers to the ripple affect extending from the Hackel zones across the fiber opposite the scribe mark, or fracture origin.

Kevlar is the trade name for the material used to increase the fiber strength within its jacket.

I. LARGE CORE FIBER OPTIC CLEAVAGE DEVICE

The cleaving device of the present invention is primarily comprised of three major components, the fiber connector block 103, the scribe assembly 120 and the chuck assembly 112. The fiber connector assembly was developed in conjunction with the fiber cleaver and is part of the fiber cleaver.

The fiber connector assembly 101 provides a means by which the fiber can be held firmly and without damage in order to inject high-power laser light. The connector must also be easily removed from the injection apparatus for cleaning, cleaving and maintainence of the injector.

Figure 11:
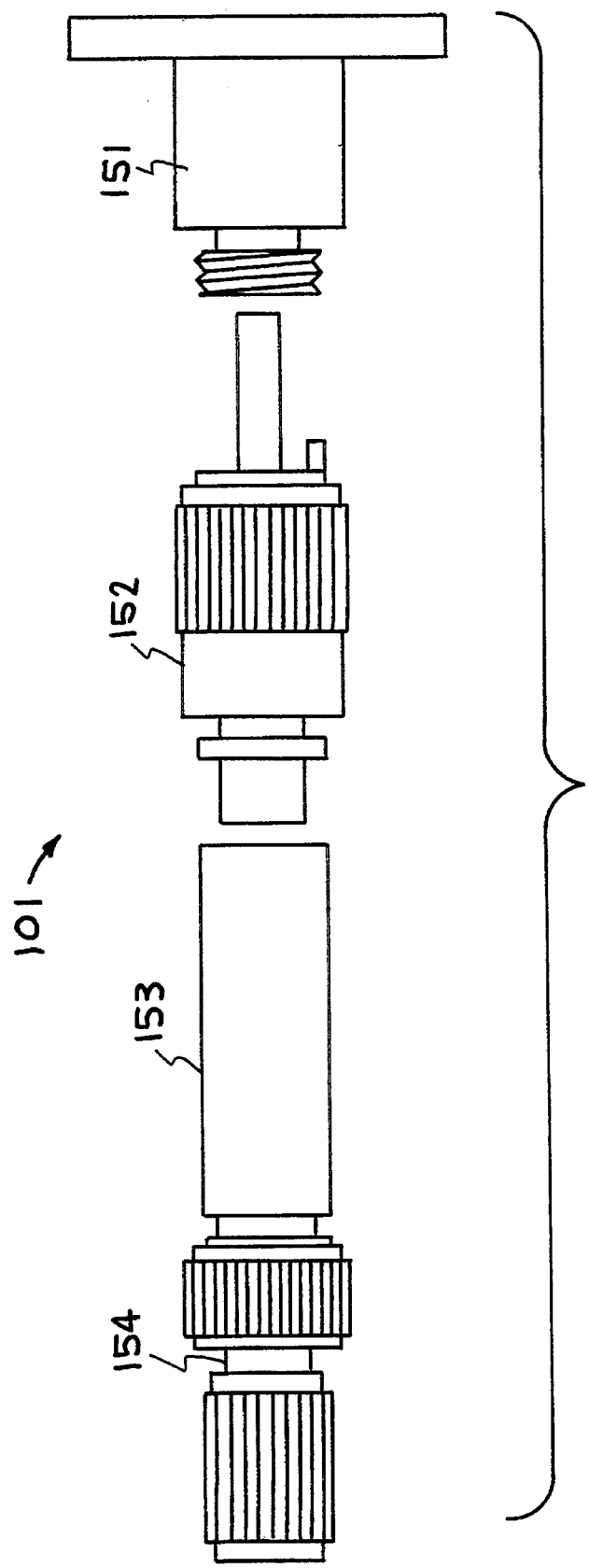
FIG. 11 depicts the fiber connector assembly.

The connector assembly, depicted in FIG. 11, is broken down into four parts: D-80 R Fiber receptacle 151 (Mitsubishi Co.), D-80 fiber connector 152 (Mitsubishi Co.), connector adaptor 153 (a 6061 T6 tempered aluminum tube), and the FPH-SR fiber strain relief 154.

The D-80 connector 152 consists of a brass ferrule with an oversized hole so that no brass contacts the fiber end. This eliminates fiber damage caused by beam steering which burns away the connector ferrule depositing material on the fiber and in turn damages the fiber face. The oversized hole incorporates a sapphire plug at the bottom that is precision made with a tightly toleranced hole in which the fiber is supported. This sapphire plug has a very high damage threshold (well above the threshold of brass) that allows it to withstand high power laser light in the event of beam misalignment. The D-80 connector comes in two sizes for 1000 μm and 600 μm core diameter fibers.

The connector adaptor 153 provides a means by which the D-80 connector 152 and fiber strain relief can be adapted together. In addition, it houses and protects the bare fiber which is left bare by the cleaving process. The D-80 connector is pressed into one end of the adaptor and the fiber strain relief is threaded onto the other end of the adaptor with ¼"-28 threads.

The fiber strain relief 154 provides the means by which the fiber is held within the assembly before and after cleaving. The fiber strain relief incorporates a small collet which clamps tightly around the fiber buffer material using a small nut. The collet supplied by the manufacturer is made of plastic and has been replaced with a brass collet to prevent the plastic from melting if the assembly gets hot.

The D-80 receptacle 151 is attached to the injector telescope and is the mating portion for the D-80 connector. It provides the means by which the fiber can be removed and re-installed into the injector with high repeatability of fiber location.

The connector assembly is completely reusable since it does not involve crimped or cemented connectors. Further, the connector assembly can be disassembled and used for spare parts or repairs.

The fiber connector block 103 provides support for the fiber connector and is adjustable for the purpose of properly aligning the device for optimum cleaves.

The fiber connector block 103 is constructed from a single piece of 6061-T6 aluminum. It incorporates a hole by which the connector block adaptor 102 is inserted and locked in place by a set screw 150, 6-32×0.250". Also included in the connector block is the "V" groove 104, the connector block clamp 105 and the connector block clamp screw 118. The "V" groove supplies a rigid mechanical support for the fiber 122. The connector block 103 can be aligned to the chuck "V" groove 113 to obtain high quality cleaves. The connector block clamp 105 supplies the means for clamping the fiber 122 tightly into the "V" groove by rotating the connector block clamp screw 118 clockwise until it is tight. The connector block mounting screw 149 is a ¼-20 socket head cap screw that provides single point rotation and lock-down of the connector block 103 following the initial alignment. The connector block also comprises four "Y" axis adjustment screws 107 and four "X" axis adjustment screws 106 which provide translation and rotation of the connector block 103 in both X and Y axes.

The connector block 103 is fully adjustable to enable proper alignment of the optical fiber 122 within the device. Adapters 102 for the connector assembly can be made to accept any connector type including SMA style, Diaguide produced by Mitsubishi, NRC fiber chucks as well as bare fiber lengths. The connector block 103 is designed with a ½" hole in it for a bushing connector adapter. Any connector of ½" diameter or less can be adapted for this device.

The cleaving device of the present invention also contains a scribe assembly 120 possessing a polycrystaline diamond edged cutting insert 111. The scribe assembly 120 is designed to enable the diamond edged scribing insert 111 to be drawn perpendicularly across the fiber 122. The scribing insert 111 includes a biasing spring 123 that is mounted on the scribe assembly 120. Any spring with an internal diameter of more than 0.125" which exerts no greater than a few ounces of pressure can be used as the biasing spring 123 in the present invention.

The tension of the scribing insert against the fiber can be adjusted for optimum cut size and depth by loosening the locking screw 124 and sliding the scriber head spring tension adjustor 125 out to reduce the tension, or inward in order to increase the spring tension. The head is supported by two dowel pins 126 which allow the biasing spring 123 to compress as the pins move into the scribe assembly 120.

Figure 7:
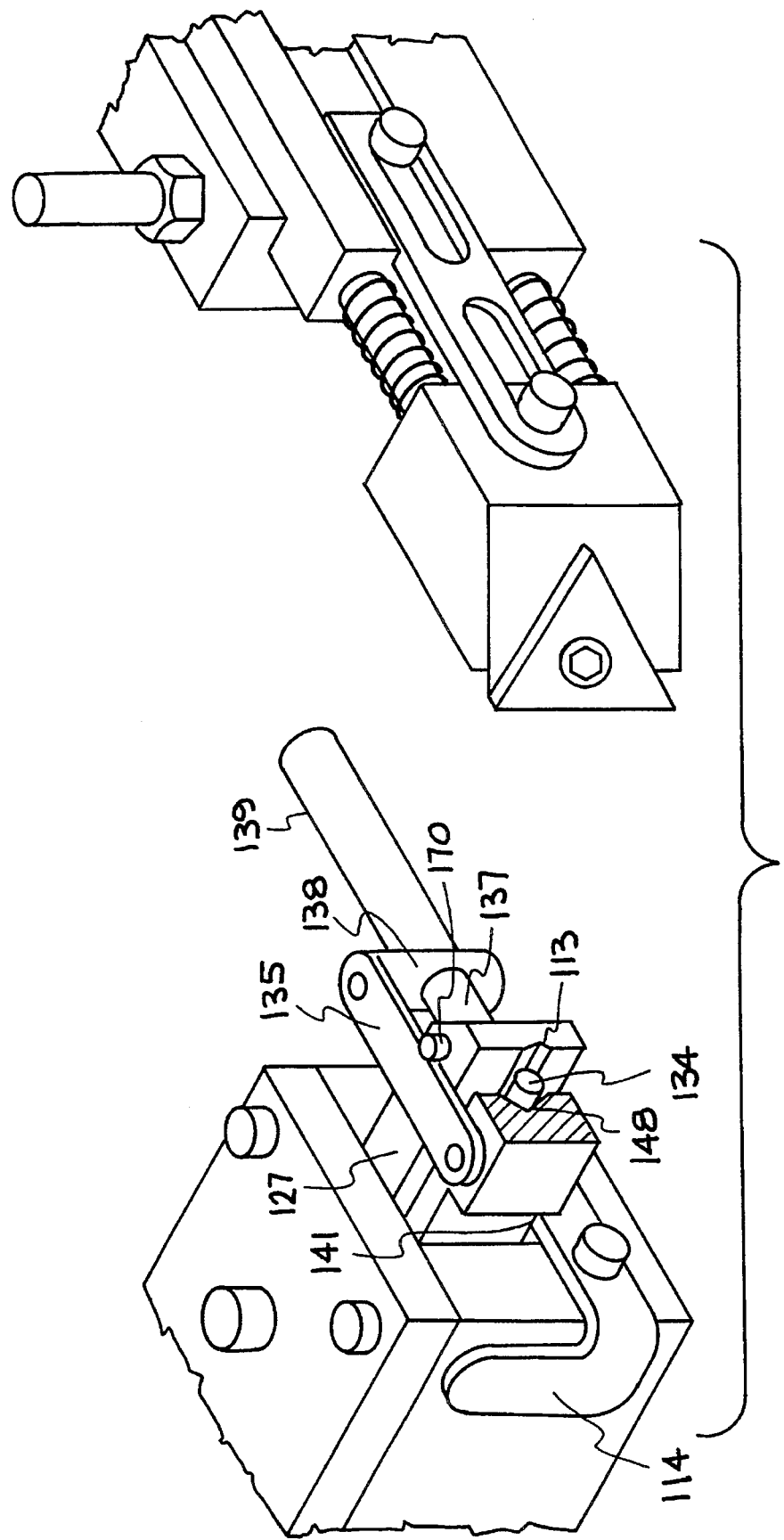
FIG. 7 depicts the chuck clamping assembly.
Figure 8A:
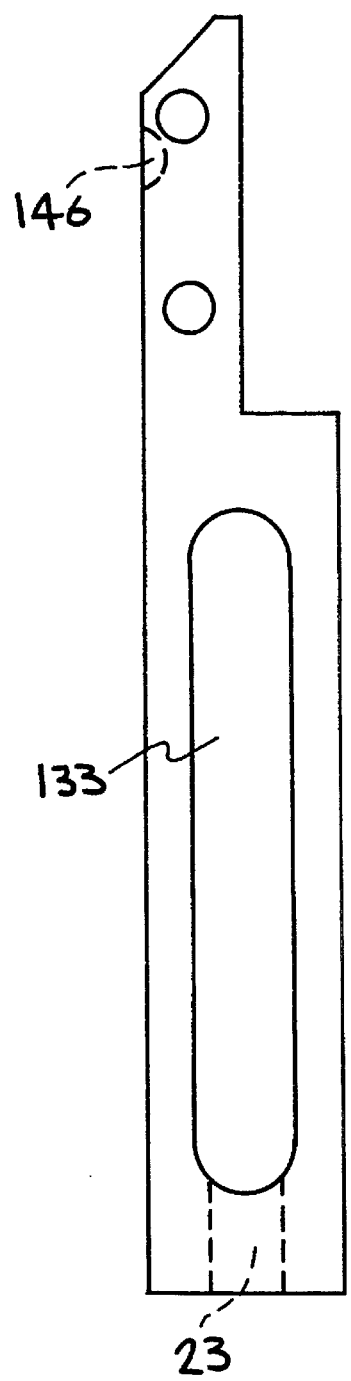
FIGS. 8A and 8B depict the chuck.
Figure 8B:
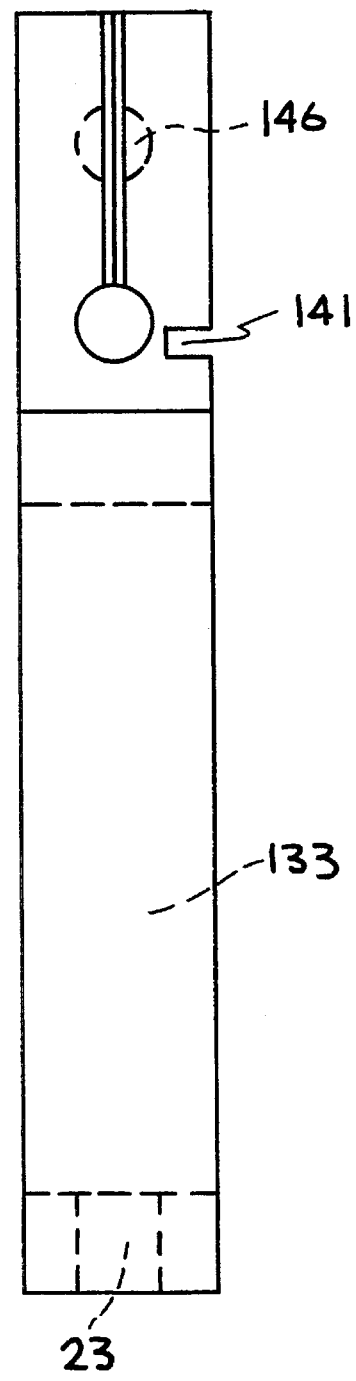

The cleaving device also contains a chuck assembly 112 which consists of the chuck 127 which fits into the slot in the chuck block 128 with a tolerance of +0.002"–0.000" for smooth bearing operation. The chuck 127 is allowed to slide along the fiber axis within the slot for the purpose of providing spring loaded tension on the fiber 122. The chuck 127 is maintained within the slot by means of a cover 129. The chuck block 128 also holds the chuck release lever 114, depicted in FIG. 7, which supplies the means for locking the chuck in the spring loaded position prior to cleavage. The chuck block 128 is fitted into a slot which is machined into the base plate 130 for the purpose of firmly aligning and holding the chuck assembly in place, perpendicular to the scribe assembly 120. The chuck block 128 is held firmly in place by two internal ¼"×20 threads/inch grade 5 socket head screws 147 approximately ⅜" long. These screws are counterbored into the bottom of the chuck block slot and threaded directly into the base plate 130. The chuck block cover 129 is bolted in place by four 8-32 screws (not depicted) located at each corner of the plate and threaded directly into the sides of the chuck block 128. The chuck block cover 129 also holds an anchor bolt 131 which extends into a slot in the chuck 127 and provides an anchor by which to attach a biasing means, herein described as an internal spring 132. The internal spring 132 pushes against the anchor bolt 131 and against the internal spring adjustment screw 140 which pushes the chuck 127 away from the fiber connector block 103. The anchor bolt 131 is threaded into the cover 129 and is preferably a 10-32×⅝" long grade 5 socket head cap screw.

The chuck 127 is preferably comprised of 0.500" square oil hardening tool steel hardened to a hardness of Rockwell 35C and precision ground to a tolerance of +0.000"–0.001" for a bearing fit into the chuck block 128. The chuck 127 incorporates a "V" groove 113 by which the fiber 122 is clamped in place by a clamp 115. The clamp 115 incorporates a slot 148 into which a strip of "O" ring material 134 is used to clamp the fiber into the "V" groove 113. The clamp 115 also uses an adjustable linkage assembly 135 for the purpose of applying pressure to the clamp 115 which in turn holds the fiber into the "V" groove 113.

The chuck 127 also provides a clamp jack screw 136 whose purpose is to enable the adjustment of even clamping pressure applied by the clamp 115 and the adjustable linkage assembly 135. The adjustable linkage screw 137 is threaded into the linkage pivot pin 138 and contacts a detent 146 in the chuck 127. The chuck clamp lever 139 is threaded over the end of the linkage screw 137 and serves to lock the screw in place following pressure adjustment. The chuck clamp lever 139 also provides a lever arm for clamp operation.

Pressure adjustment is accomplished using the linkage adjustment screw 137. First, the chuck clamp lever 139 is loosened and an allen wrench is then inserted through the end of the chuck clamp lever 139. A piece of the fiber 122 is then placed into the chuck groove 113, clamped into the chuck block "V" groove 104 and the linkage adjustment screw 137 is tightened to the desired pressure.

The pressure required for clamping the fiber in place is determined by the fiber diameter and is set by releasing the chuck release lever 114 without scribing the fiber. Proper pressure is achieved when the fiber remains within the "V" groove 113 without slipping. The clamp jack screw 136 is used to keep the clamp parallel with the chuck 127. Pressure is applied to the fiber when the linkage adjustment screw 137 is rotated clockwise, pulling the pivot pin 138 away from the chuck 127. Pressure is transferred through the linkage assembly 135 to the chuck clamp 115 forcing the rubber "0" ring strip 134 against the fiber 122 thus clamping it firmly into the chuck "V" groove 113. After the pressure is adjusted, the chuck clamp lever 139 is tightened to lock the linkage adjustment screw 137 in place.

The chuck 127 also houses an internal spring 132 which serves to drive the chuck assembly from the loaded to the unloaded position thereby cleaving the fiber. The chuck 127 also houses a spring adjustment screw 140 and a release lever slot 141 for locking the chuck in the loaded position. The internal spring 132 is a compression spring, the size of which is determined by the fiber to be cleaved. When cleaving a 600 μm fiber, a steel ¼" diameter×2" long 0.032" wire diameter extension spring is preferred. The internal spring 132 pushes against the chuck block 128 via the spring anchor bolt 131 and against the chuck 127 by the spring adjustment screw 140 which is threaded into the rear of the chuck 127. The spring adjustment screw 140 is a rod ¼"- 28 threaded into a spring adjustment screw knob 143. The spring adjustment screw 140 is 2" long with a portion that is 0.125" long×0.125 diameter end. The spring 132 slips over this narrow portion and is held straight within the slot 131 for the internal spring 132. A ¼"- 28 nut 142 is used between the spring adjustment screw knob 143 and the chuck 127 as a locking device. The nut 142 is tightened against the chuck 127 after the spring tension is adjusted during the initial alignment of the device.

The size of internal spring 132 used depends on the diameter of the fiber to be cleaved. For example, the internal spring 132 used to cleave a 1000 μm core diameter fiber is a steel 0.050" by 0.25" by 1.5" long wire compression spring. The internal spring 132 used to cleave a 600 μm core diameter fiber is a steel 0.032" by 0.25" by 1.5" long wire compression spring. The internal spring 132 used to cleave smaller core diameter fibers is a steel 0.015"–0.020" by 0.25" by 1.5" long wire compression spring. Spring tension is adjusted after evaluating the fiber surface after cleavage. When the tension applied is too great, hackling on the fiber face is observed. When too little tension is applied, either the device will fail to cleave the fiber or the fiber face will be irregular and/or not perpendicular to the fiber axis.

The chuck 127 possesses a slot 141 for which a tab on the release lever 114 enters, holding the chuck 127 in the spring loaded position. Cleaving is accomplished by releasing the chuck 127 from the loaded position using the chuck release lever 114 wherein the chuck 127 is instantaneously driven to the unloaded position by the internal spring 132. In the process, a high level of pulling tension is applied to the fiber causing its cleavage.

II. METHOD FOR CLEAVING LARGE CORE OPTICAL FIBERS

In order to cleave an optical fiber using the cleaving device of the present invention, the fiber cleaver must first be cleaned.

Cleaning of the fiber cleaver is accomplished using a cotton tipped applicator and a solvent solution consisting of 50% reagent grade acetone and 50% reagent grade methanol. First, the fiber connector block clamp screw 118 is loosened such that the connector block "V" groove 104 is visible. Several drops of the solvent solution are then placed on the applicator which is used to remove any oils and debris from the "V" grove and clamp rubber.

In order to clean the scribe assembly, it is preferable to place the fiber chuck assembly 112 in the unloaded position in order to provide maximum clearance between the chuck 127 and the scribe assembly 171. Once the fiber chuck assembly 112 is placed in the unloaded position, the bearing set screw 172, located at the top of the scribe support 156, is loosened. The scribe wheel 162 may then be moved towards the fiber chuck assembly 112 and removed. The scribe wheel should be inspected for dirt.

Rotary Scribe Inspection

Proper operation of the scribe arm 163 may be checked by depressing the pin 159. The scribe arm 163 should swing past the center of the hole in the scribe wheel 162.

The chuck clamp stop screw 170 should now be removed in order to then remove the chuck clamp 115. Using an applicator, the solvent solution can be used to clean the chuck "V" groove 113 and the chuck clamp "o" ring material 134. Once cleaned, the chuck clamp 115, the chuck clamp stop screw 170 and the scribe wheel 162 should be reinstalled and the device checked for proper operation.

The length of fiber that must be stripped depends on the connector type used and the fiber diameter. Any connector possessing an outside diameter of ½" or less can be adapted, using the connector block adaptor 102 to fit this device. In the preferred embodiment, the connector is modified for the purpose of completely enclosing the stripped fiber after cleaving and is completely reusable. The preferred connector incorporates a Newport Research FPH-SR Fiber strain relief for the purpose of clamping the fiber into the fiber connector assembly 101 following cleavage.

The fiber jacket should be stripped to a length of between about 120–195 mm. Between about 45–55 mm of buffer material should also be removed. A piece of ¼" diameter electrical heat shrink tubing 121 of approximately 100 mm in length is placed over the fiber jacket in order to hold the strain relief material, made of Kevlar, out of the way during the cleaving process. This piece of heat shrink will be used to attach the Kevlar to the strain relief 154 after cleaving.

Table 1 provides a summary of the preferred strip lengths for several applications.

TABLE 1

| Fiber Core ⌀ & Connection | Jacket Strip Length | Buffer Strip Length | Kevlar |
|---|---|---|---|
| 600 μm D-80 | 120 mm | 50 mm | Trim for strain release |
| 600 μm bare fiber | 150 mm | 50 mm | 150 mm |
| 1000 μm D-80 | 120 mm | 55 mm | Trim for strain release |
| 1000 μm bare fiber | 195 mm | 55 mm | 150 mm |

Once the fiber is stripped, the fiber must be cleaned before and after insertion into the connector assembly, preferably using the solvent solution.

The fiber 122 is pushed through the back of the fiber strain relief 154 until the buffer material makes contact with the internal portion of the D-80 connector and stops. The fiber strain relief 154 is then tightened and the fiber is secured into the connector.

Figure 2:
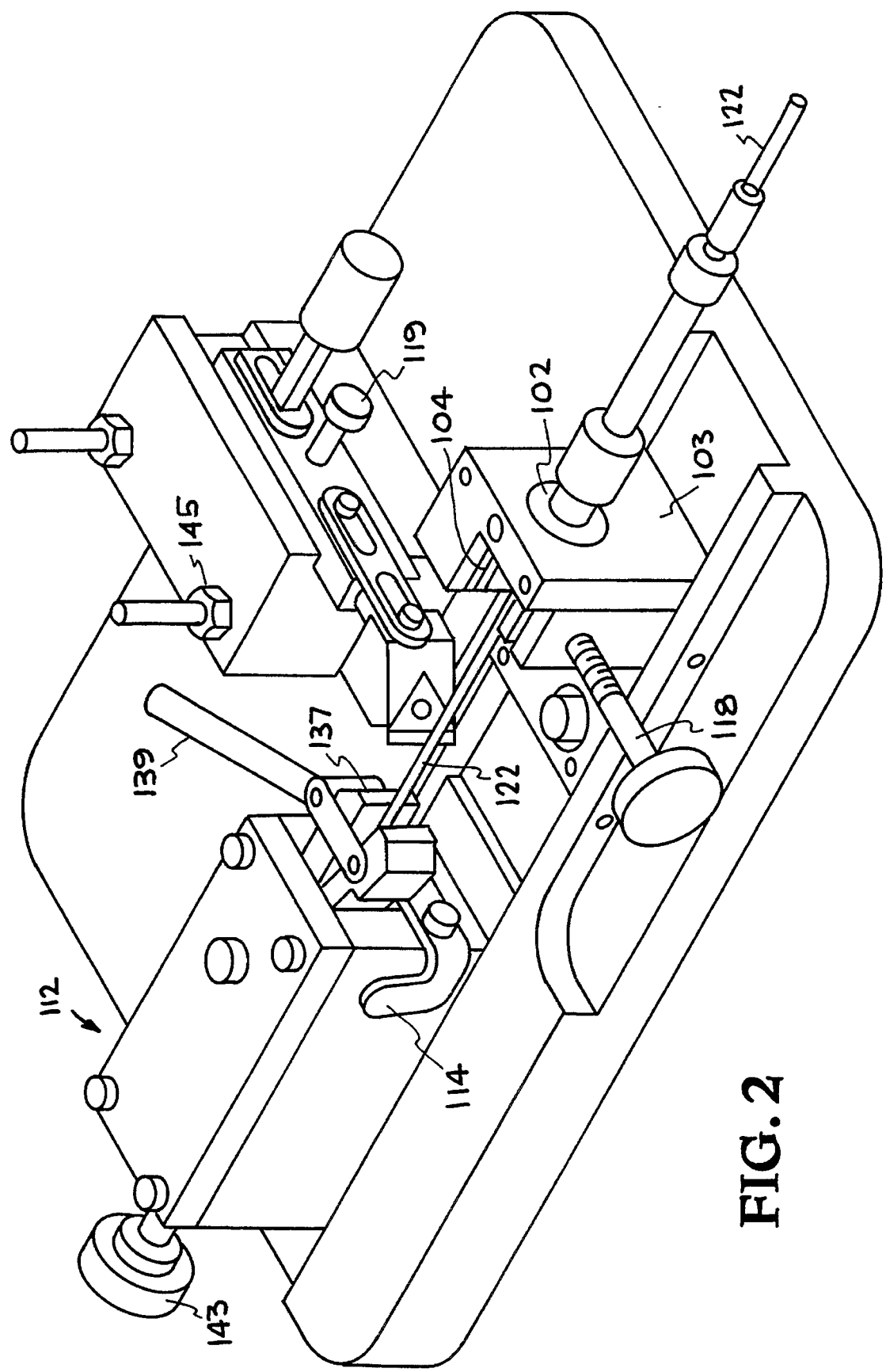
FIG. 2 illustrates the step of placing the fiber within the device.

Before the fiber and connector are inserted into the fiber connector block 103, the chuck assembly 122 is locked in the loaded position. As depicted in FIG. 2, this is done by pushing the entire chuck 127 towards the fiber connector block 103 via the spring adjustment screw knob 143 until the chuck release lever 114 snaps into the release lever slot 141.

In order to insert the fiber, the chuck clamp 115 must first be opened. This is done by pulling the chuck clamp lever 139 away from the fiber connector block 103 until the linkage assembly screw 137 disengages from the chuck detent 146. The connector block clamp 105 is then opened by turning the connector block clamp screw 118 counter clockwise until the fiber can be inserted unobstructed. The fiber is then inserted until the connector mates with the receptacle in the connector block adaptor 102.

Figure 3A:
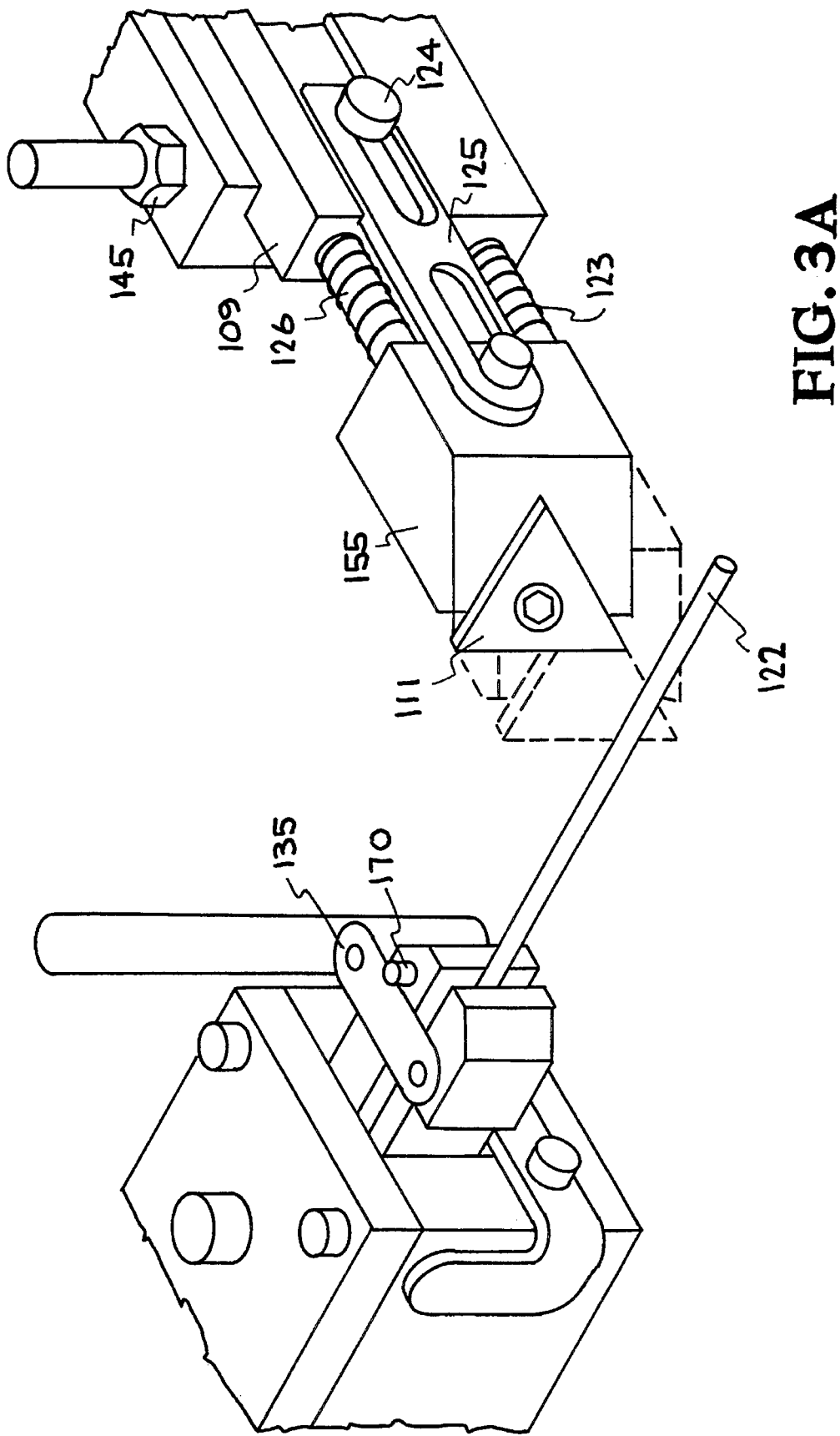
FIGS. 3A, 3B and 3C illustrate the step of scribing the fiber.
Figure 3B:
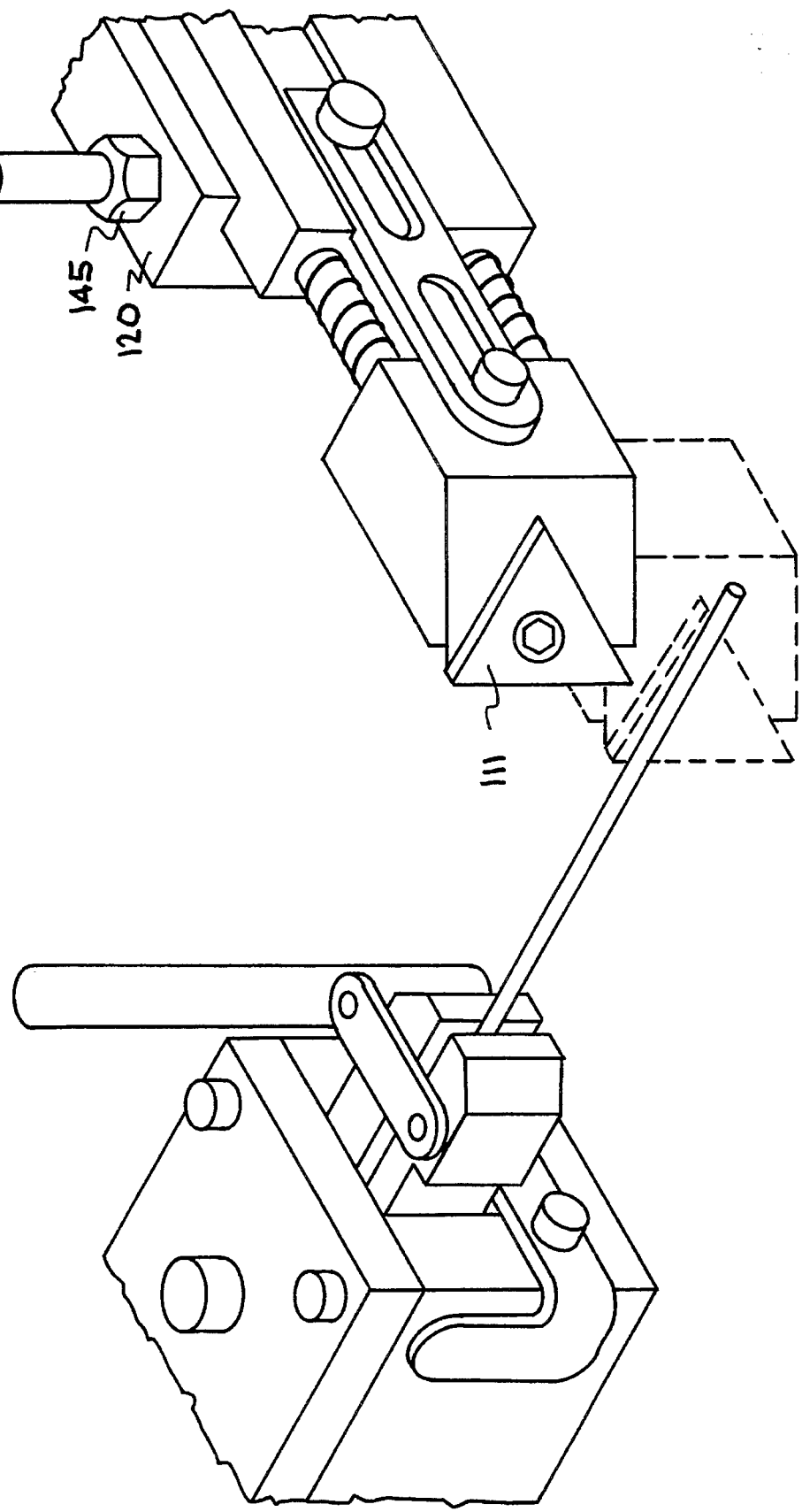
Figure 3C:
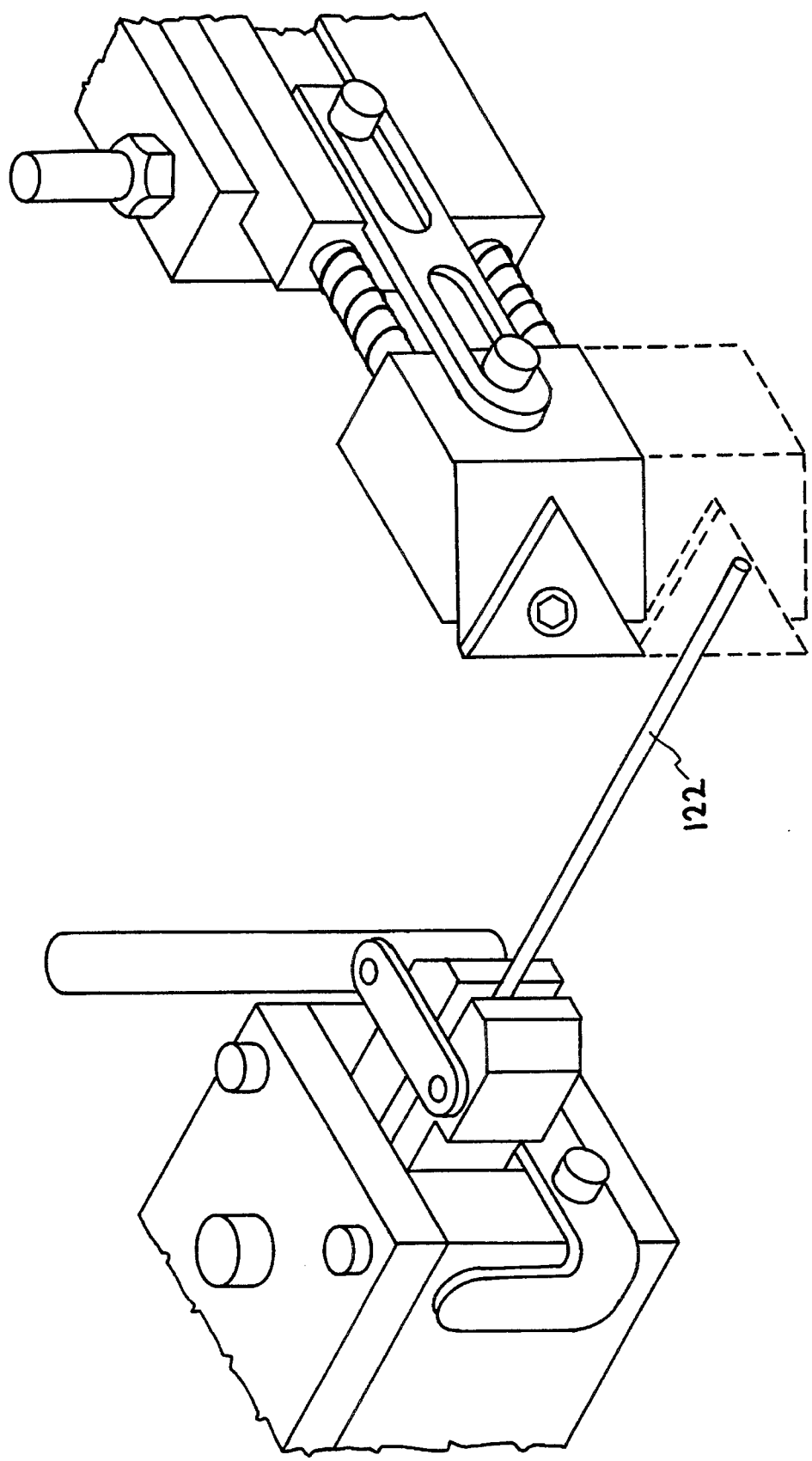

The fiber is clamped into the fiber connector block 103 by rotating the connector block clamp screw 118 clockwise until the screw is tight. The chuck clamp lever 139 is then pulled back away from the fiber connector block 103 until the linkage assembly screw 137 fits into the detent 146. The chuck clamp lever 139 is then moved clockwise towards the fiber connector block 103 until the chuck linkage assembly 135 contacts the chuck clamp stop screw 170 as shown in FIG. 3A. The fiber should now be firmly clamped into the device and be ready to be scribed.

As shown in FIGS. 3A–3C and FIG. 6B in order to scribe the fiber, the scribe assembly handle 119 should be pulled up until it hits the "Y" axis stop 145. The scribe assembly handle 119 should then be pulled towards the fiber, maintaining firm pressure against the "X" and "Y" axis stops 145, until the key 109 hits the "X" axis stop. While applying pressure to the X axis stop 144, the scribe assembly handle is pushed down until the scribe assembly 120 stops. The assembly handle 119 should then be pulled away from the fiber until it stops.

Once the fiber 122 is scribed, tension is applied via the chuck internal spring 132 by pressing the chuck release lever 114 towards the chuck block 128 until the chuck release lever 114 clears the release lever slot 141. The internal spring 132 pushes against the anchor bolt 131 and adjustment screw 140 thereby forcing the chuck 127 away from the fiber connector block 103, thereby applying tension in an axial direction on the fiber and causing the fiber 122 to cleave at the location at which it was scribed. The fiber and connector can then be removed from the cleaver and the end surface inspected for surface quality.

In the event of a malfunction the cleaver clamping surfaces should be cleaned and the cleavage reattempted. The occurrence of three consecutive malfunctions may indicate cleaver misalignment or fiber clamp surface damage.

III. METHOD FOR ALIGNING THE OPTICAL FIBER CLEAVING DEVICE

In order for the above-described optical fiber cleavage device to cleave large core optical fibers and yield high quality fiber faces, the present device must be properly adjusted with regard to the fiber's alignment within the device. Alignment of the device should be performed during the initial set-up of the device. Once the device has been aligned, that alignment is retained by the device thus enabling one to cleave a large number of fibers without further adjustment of the device.

Alignment of the device is accomplished using two stubs of fiber, one stub being clamped into the chuck "V" groove 113 and the other stub being clamped into the connector block "V" groove 104. A magnification 12 eye loupe is used to examine the position of the two stubs relative to each other.

The fiber connector block 103 is adjusted using the four "X" axis adjustment screws 106 and the four "Y" axis adjustment screws 107 so that the two fiber stubs are aligned with each other in the x, y and phi axes. (See FIG. 4) Alignment with regard to the theta axis is adjusted so that the stubs are at a slight angle, approximately −0.5°, relative to the scribe assembly 120. This slight angle causes the uncleaved fiber to bend at a very large radius, thus introducing very high stress at the scribed point on the fiber without directly contacting the fiber 122. This method is a key to successful large core fiber cleaves.

Alignment of the fiber optical cleaver is conducted following the installation of the chuck assembly 112, the scribe assembly 120 and the fiber connector block 103, on the base plate 130. The chuck clamp 115 is first removed so that the chuck "V" groove 113 is visible from the side. A length of fiber 122, completely stripped of its buffer material, approximately 80 to 100 millimeters long, is inserted through the connector adaptor 102. The fiber 122 is clamped into the connector block "V" groove 104 using the connector block clamp 105 such that it makes contact with at least 10 millimeters of the length of the chuck "V" groove 113.

Using a suitable magnifier (Loupe) of 8 to 12×, the alignment of the fiber 122 in the "V" groove 113 is inspected by looking through the fiber at the "V" groove 113. First, the vertical position of the fiber is adjusted. This is accomplished by loosening the connector block mounting screw 149 approximately ½ turn. Preferably, a steel curved spring washer is installed between the screw 149 and the connector block 103 to provide downward pressure against the adjustment screws 107 for ease of alignment and to hold the connector block 103 steady when the connector block mounting screw 149 is tightened following completion of the alignment procedure.

Figure 4:
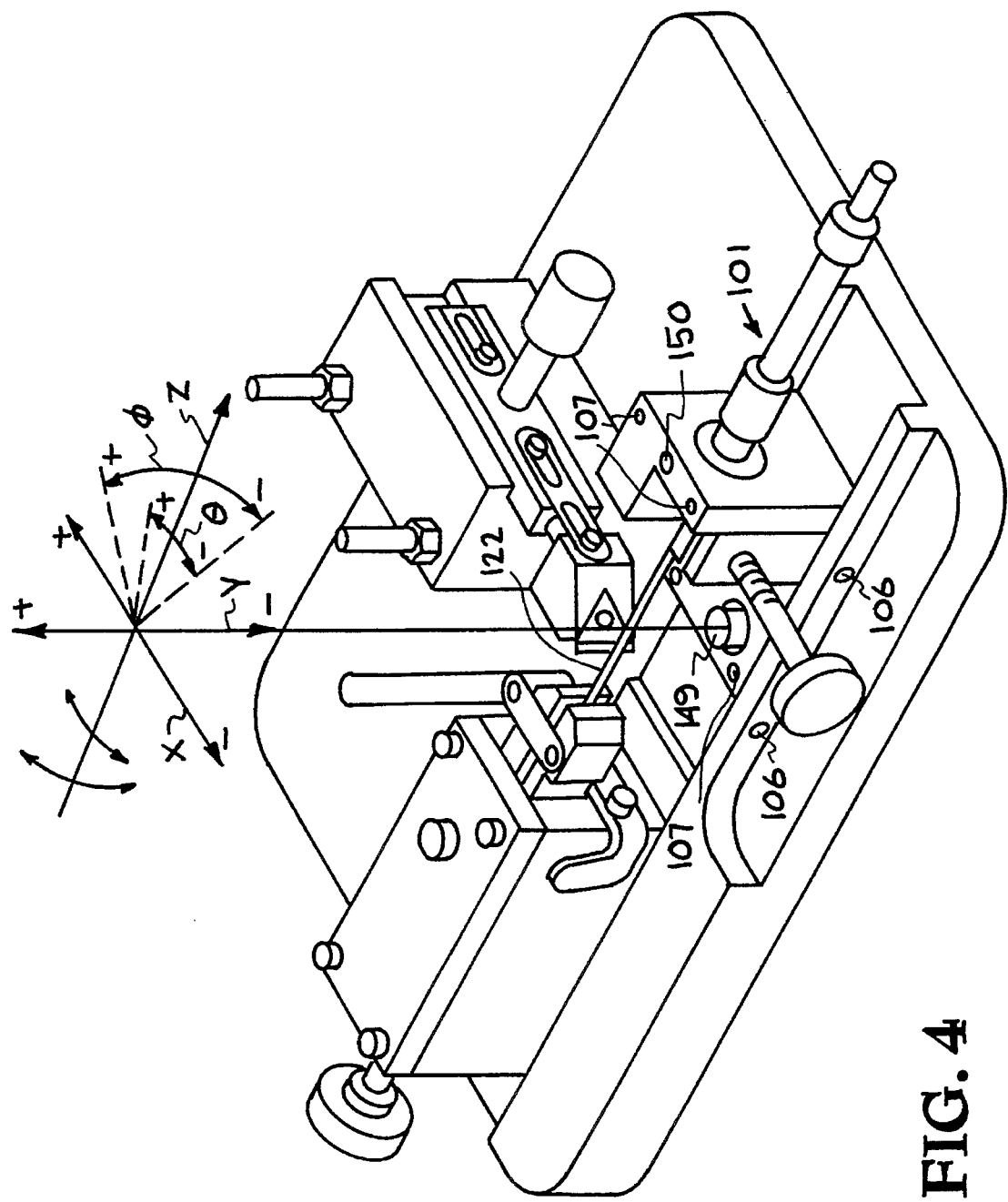
FIG. 4 illustrates the step of aligning the fiber cleaver. This step defines the adjustment terms used in the alignment procedure.
Figure 5:
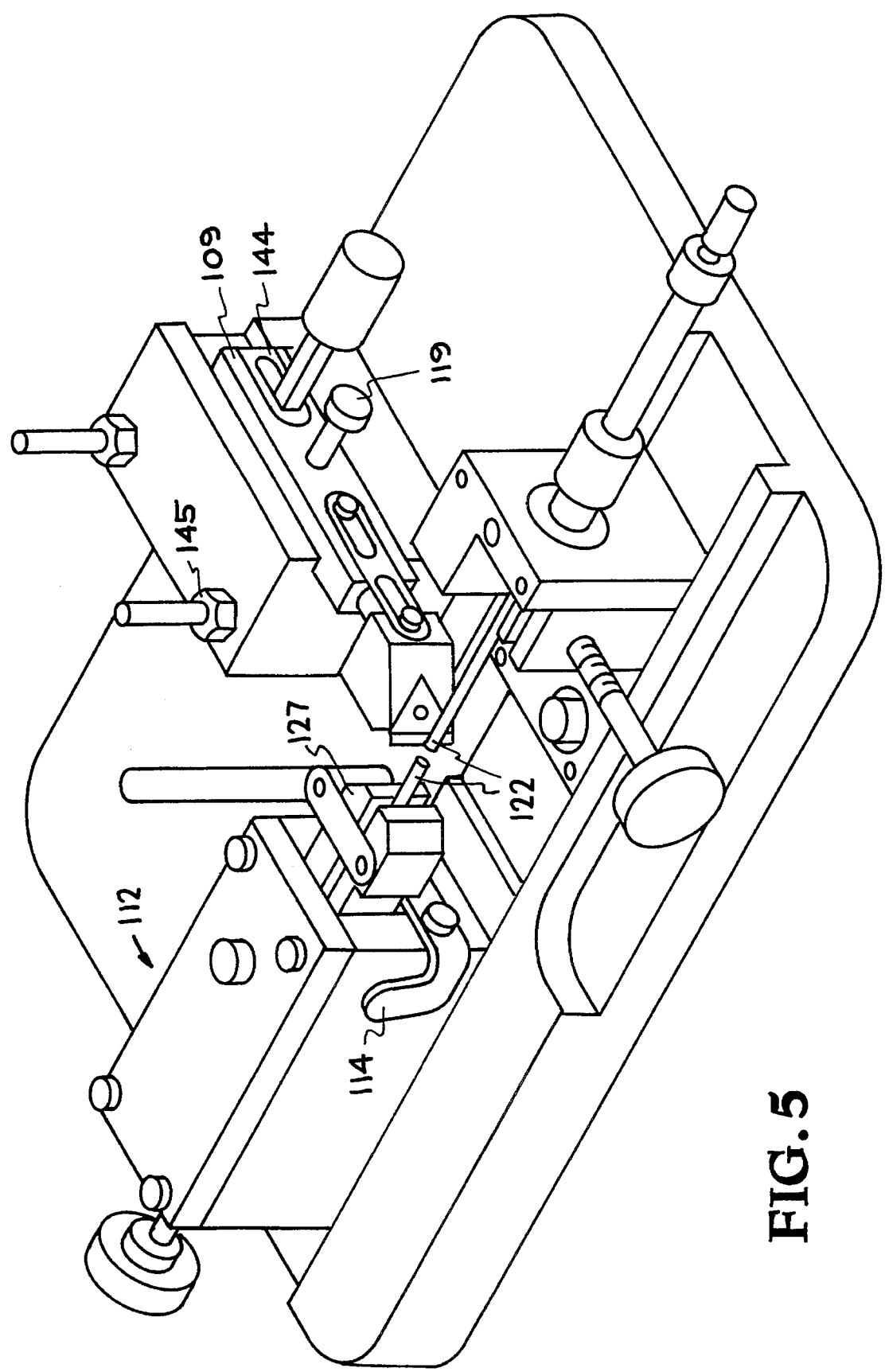
FIG. 5 illustrates the step of cleaving the fiber by release of the spring loaded chuck.
Figure 6A:
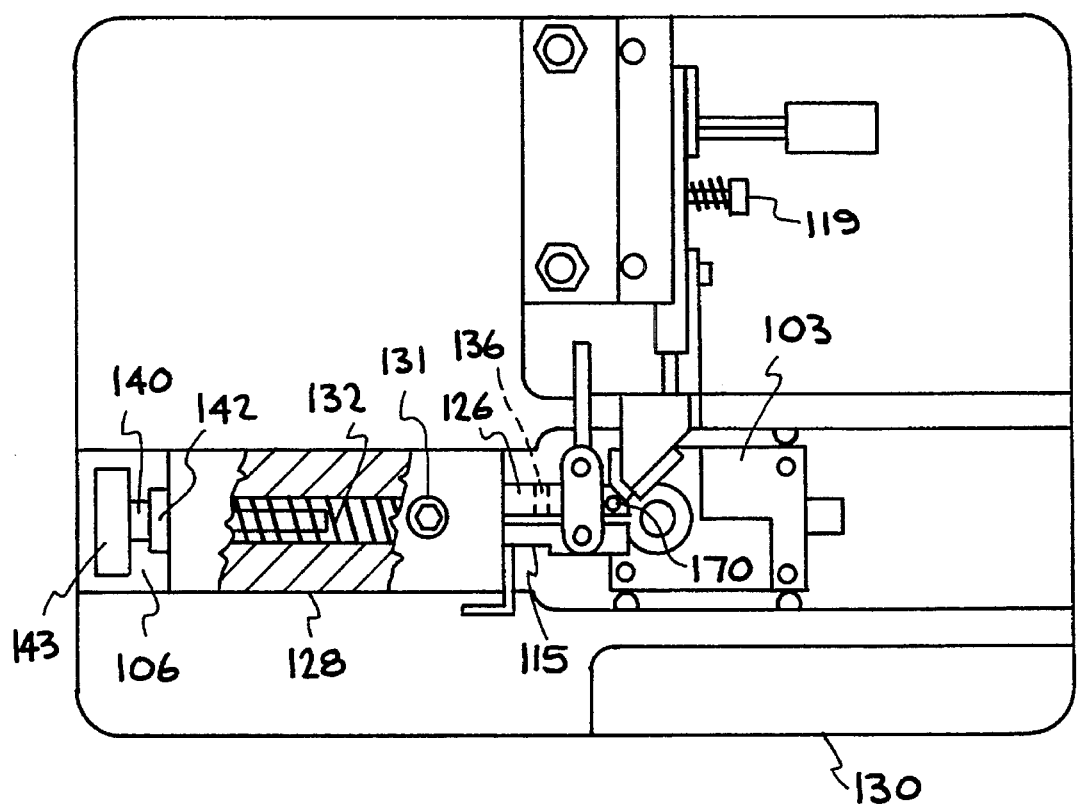
FIGS. 6A and 6B depict the top and side views of the device.
Figure 6B:
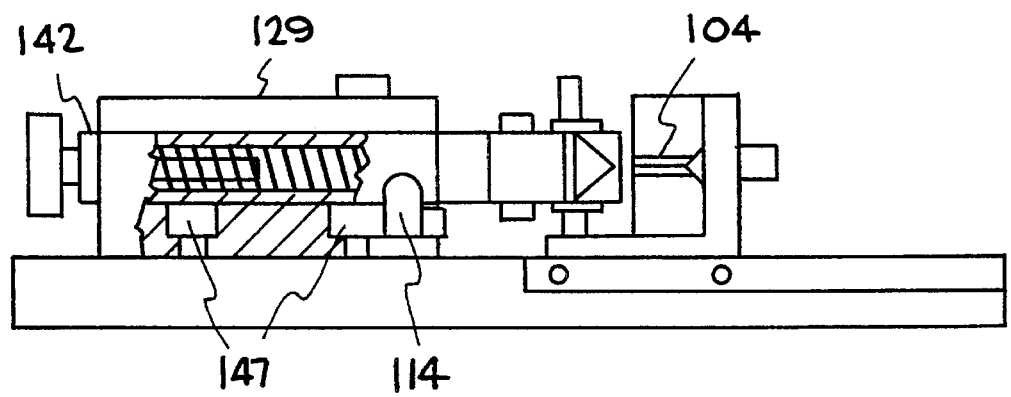

As shown in FIG. 4, the four "Y" axis adjustment screws 107 (6-32×¼" set screws) are inserted into four threaded holes in the connector block 103 and serve as jacks between the connector block 103 and the base plate 130 for the purpose of vertical "Y" axis translation and Phi (ø) angle adjustment. Vertical adjustment is accomplished by turning all four adjustment screws 107 clockwise to raise the connector block 103 and counter-clockwise to lower the connector block 103. The "ø" angle adjustment is accomplished by rotating only the two "Y" axis adjustment screws 107 located on either side of the fiber connector adaptor 102. Positive angle rotation of the connector block 103 is accomplished by rotating the screws clockwise, negative angle rotation by rotating the screws counter-clockwise.

Figure 9A:
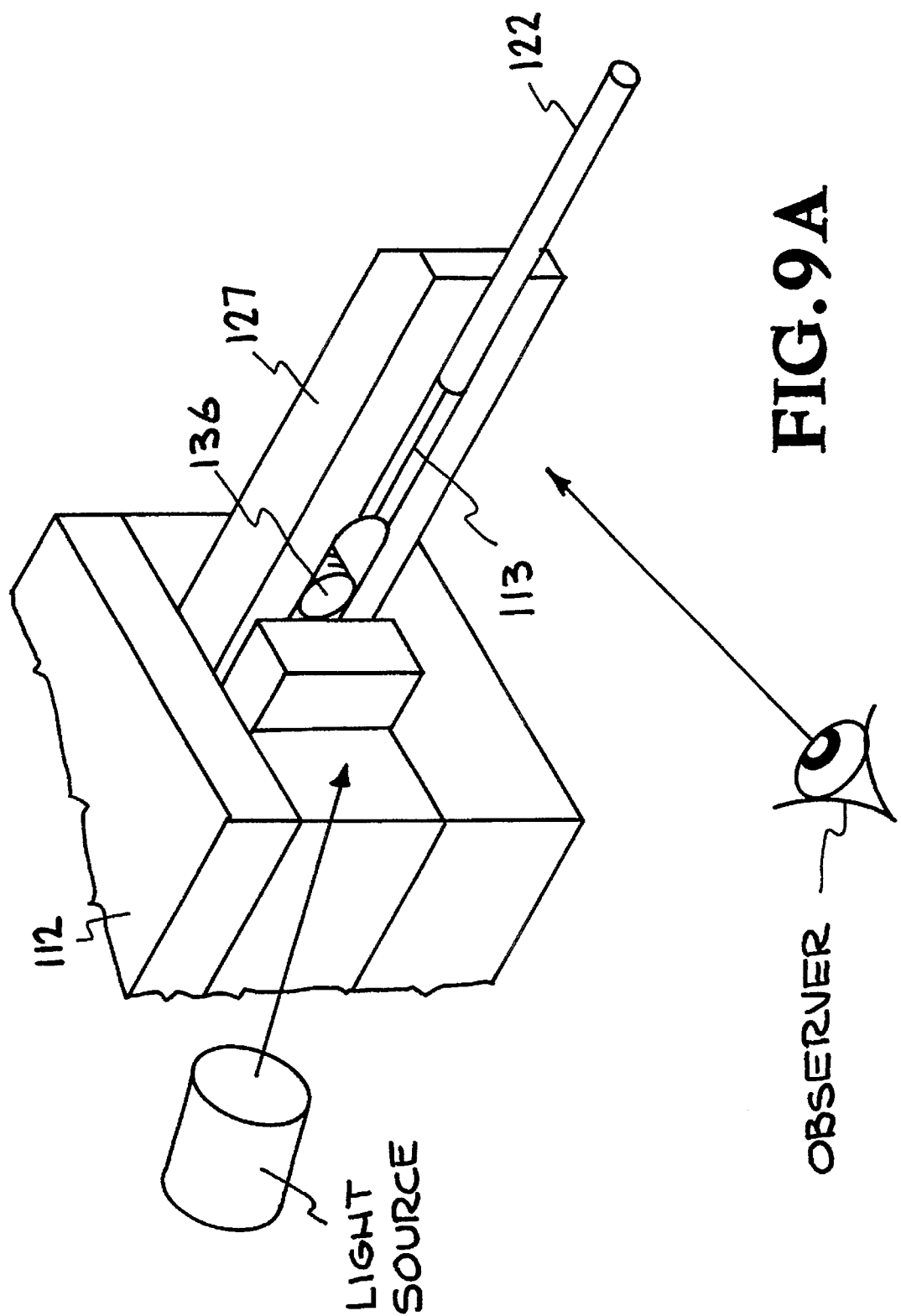
Figure 9B:
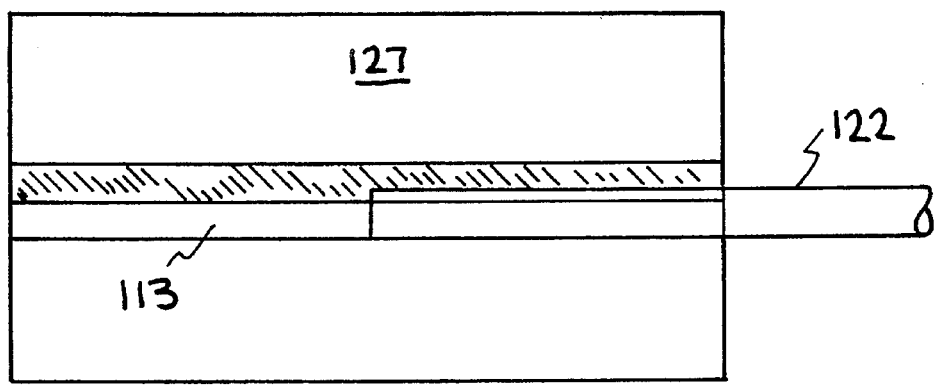
Figure 9C:
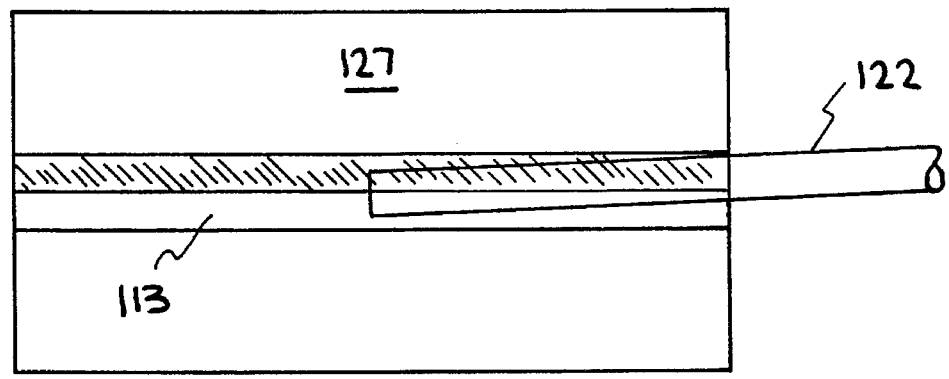
Figure 9D:
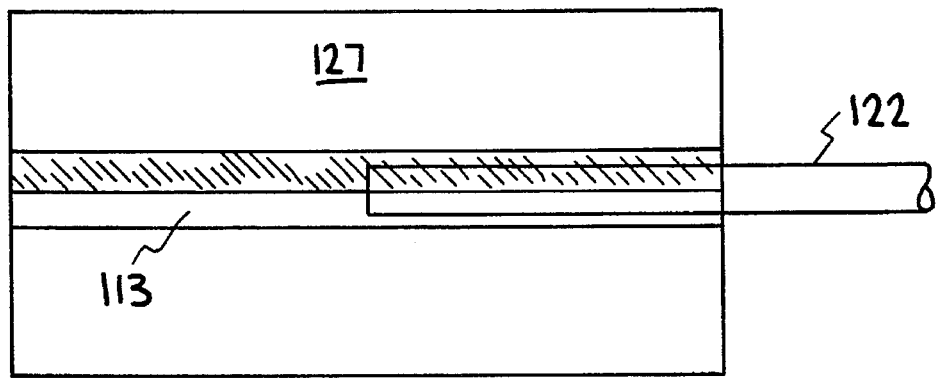

FIG. 9A illustrates the viewing angle for alignment of the fiber 122 to the chuck "V" groove 113. FIG. 9B illustrates a vertical misalignment where the fiber is positioned too low. FIG. 9C illustrates a rotational misalignment of the fiber to the "V" groove. FIG. 9D illustrates proper alignment of the fiber to the "V" groove. It is important to note that viewing the "V" groove through the fiber increases alignment sensitivity because the fiber acts as a cylindrical lens which magnifies the chuck "V" groove. This higher magnification enhances "V" groove visibility which increases the viewer's sensitivity to errors in the alignment. The viewer sensitivity can be further enhanced by illuminating the "V" groove with any light source placed above the viewers head and pointed directly at the chuck 127. This illuminates the lower portion of the "V" groove which will appear brighter than the upper portion thereby providing increased resolution between the upper and lower portions. One should make sure that the chuck 127 is latched into the loaded position prior to continuing the alignment procedure.

Figure 10A:
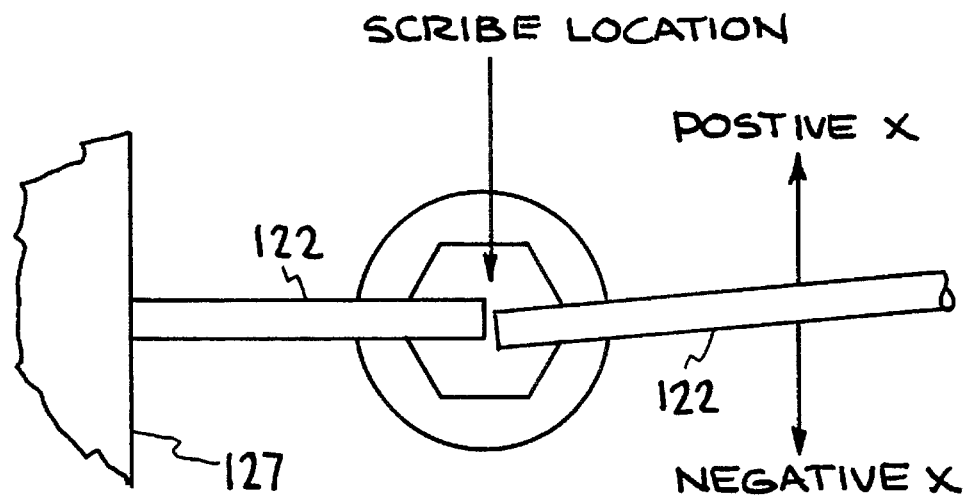
FIGS. 10A–10B illustrate the alignment of the fiber along the "X" axis.
Figure 10B:
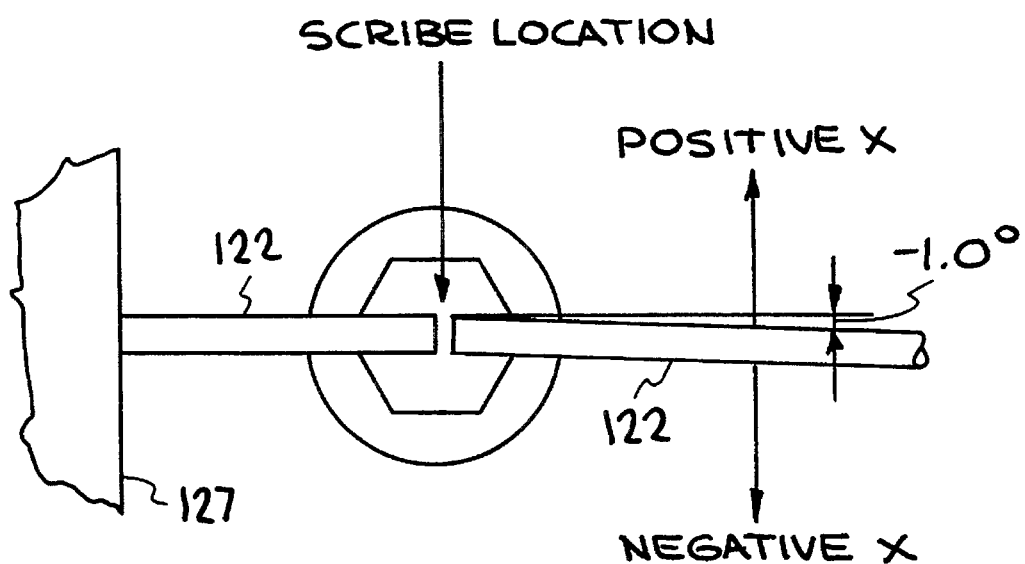

After the chuck "V" groove 113 and fiber 122 are aligned, the fiber is then removed from the device and the chuck clamp 115 is reinstalled. The next step in the alignment process requires a short piece (15 mm long) of bare fiber to be inserted into the chuck 127 and clamped in place with approximately 5 mm of fiber protruding from the end of the chuck. This can be accomplished by simply viewing the device from directly above the connector block mounting screw 149 and aligning the end of the fiber to the center of the connector block mounting screw 149. The fiber should then be clamped into place using the chuck clamp lever 139. A scrap piece of fiber is then inserted into the connector block "V" groove 104 until the two fiber ends are separated by ≈½ millimeter. The fiber piece is then clamped into the connector block "V" groove 104 using the connector block clamp 115. A small piece of white paper is then placed over the connector block mounting screw 149. This improves visibility of the fiber ends. Then, as shown in FIGS. 10A and 10B, the alignment of the fiber ends in the "X" axis is inspected by looking down with the loupe at the fiber ends.

"X" axis alignment is accomplished by first loosening (counter-clockwise rotation) all four "X" axis adjustment screws 106. Rough alignment can be accomplished by simply positioning the connector block 103 by hand. Spring tension is provided by the connector block mounting screw 149. The curved washer under the connector block mounting screw 149 prevents the connector block from moving freely. Fine adjustment of the connector block 103 is accomplished by adjustment of the connector block "X" axis adjustment screws 106. Translation is done using the two adjustment screws 106 closest to the fiber ends simply by counter-rotating the screws. Rotating the screw closest to the clamp 105 side of the connector block 103 counter-clockwise moves the fiber end in a negative "X" direction while clockwise rotation moves the fiber end in a positive "X" direction. Proper alignment is achieved when the two fiber ends are aligned to ±0.005 mm and the connector block end is rotated by −1.0°. This −1.0° angle serves to bend the uncleaved fiber at a very long radius of curvature away from the scribe thereby increasing the stress on the fiber surface at the point of the scribe. The increased stress helps to initiate cleaving after scribing when tension is applied along the "Z" axis of the fiber. The −1.0° angle is merely a starting point for the alignment process. That angle is eventually decreased after several cleaves have been performed in which adjustments to scribe depth and stroke and "Z" axis tension are made.

At this point in the alignment process, all "X" axis adjustment screws 106 are turned clockwise until contact is made with the connector block 103 while observing the fiber ends through the 12× loupe, being careful not to move the connector block. The connector block mounting screw 149 is also tightened to prevent the connector block 103 from moving during the initial cleaves.

In this step of the alignment process, sample cleaves are performed in order to evaluate the resulting end surface. Table 2 provides a troubleshooting guide in the event that the cleaver fails to operate.

TABLE 2

| SYMPTOM | FAULT/CORRECTION |
| --- | --- |
| Fiber breaks when scribed | 1. Too much spring tension on scribe head. Loosen scribe assembly handle 119 and slide "X" axis stop 144 towards scribe head 155 ≈ .5 mm and try again. If the diamond edge cutting insert 111 fails to contact fiber 122, then loosen locking screw 124 and slide spring tension adjustor 125 towards diamond edge cutting insert 111 ≈ .5 mm. Retest alignment.<br>2. Too long of a stroke on scribe assembly. Loosen set screw on "Y" axis stop 145 and lower ≈ 2 mm. Note: moving one stop at a time allows the other stop to be used as a reference for measuring the 2 mm distance. Retest alignment.<br>3. Greater than −1.0° angle on "X" axis rotation. Using the 8-12x loupe and two short stubs of fiber, rotate "X" axis in a positive direction. Check for fiber end off-set and adjust if necessary. |
| Fiber does not cleave when chuck release level is pushed | "X" axis rotation is 0° or positive. Follow procedure above, checking for "X" axis rotation and rotate to ≈−1.0°.<br>4. Scribe depth too shallow (too little tension on scribe head). Loosen scribe assembly handle 119 and slide "X" axis stop 144 away from scribe head 155 ≈ .5 mm. Retest alignment. |
| Fiber cleaves at a steep angle or has spike on the end. | 5. Fiber "X" axis or "Y" axis has off-set (misaligned). Follow alignment procedure at the beginning of this procedure and look for any misalignment. Too little spring tension on chuck assembly.<br>6. Loosen adjustment screw lock nut 142 and turn spring adjustment screw knob 143 clockwise a full turn and attempt another cleave. Repeat until fiber cleaves straight. |

Figure 13:
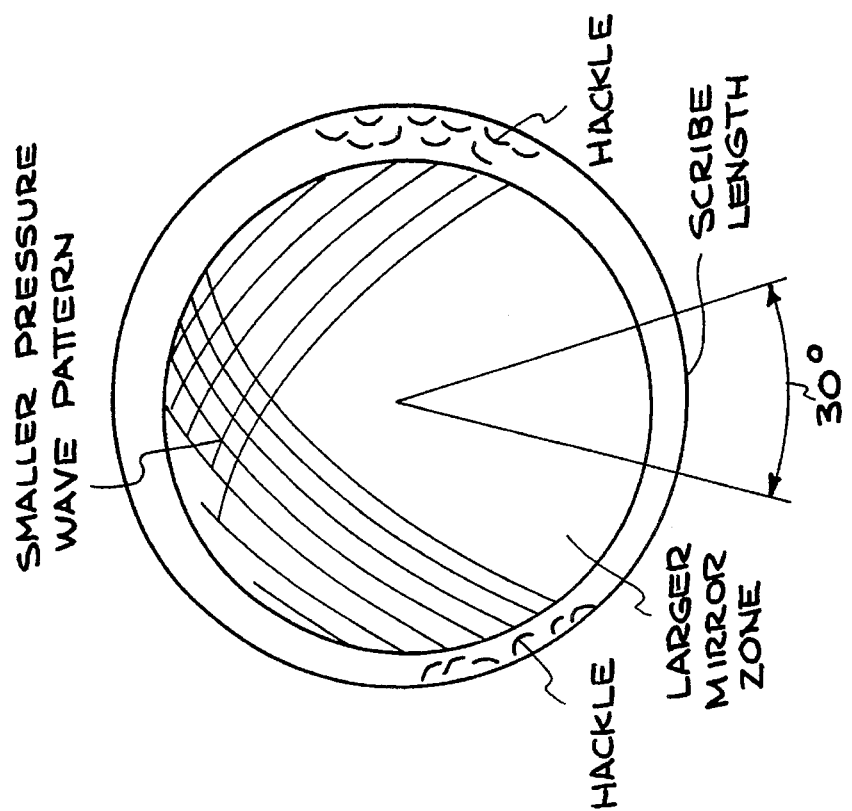
FIG. 13 depicts an image of a cleaved fiber using the rotary scribe means.

At this point, the optical fiber cleaver should be able to cleave fibers. The resulting fiber faces should now be examined closely to determine what adjustments are necessary for optimization of the cleave. The terminology employed to describe the fiber cleavage defects observed in FIGS. 12 and 13 are described in C. Kao, et al., Fiber Optics: Advances in Research and Development, "Fiber Connectors, Splices and Couplers" (Bendow and Mitra, eds.) Plenum Press, New York p. 437 (1979) with the exception of a "pressure wave" pattern. A pressure wave pattern refers to the ripple effect on the fiber face adjacent to the fracture origin, the position of the initial scribe.

FIG. 12 illustrates a typical fiber end face cleaved with the device of the present invention. There are three factors involved with the proper alignment of the device and are very closely coupled. The first is the alignment of the connector block "V" groove 104 with respect to the chuck "V" groove 113. The second factor is the scribe depth and length. The third factor is the fiber axial tension.

The alignment of the "V" grooves is indicated by the symmetry of the hackle zones with respect to the scribe location.

In order for the viewer to be consistently oriented with respect to "X" versus "Y" and right versus left when referring to the fiber face, all photos and orientations are addressed using the connectorized fiber end. Thus, the fiber is depicted such that the scribe mark or fracture origin is located in the lower portion of the figure. The hackle zone on the left is the upper hackle zone because it represents the side of the fiber that was facing up when the fiber was cleaved. Likewise, the hackle zone on the right was the side of the fiber facing down when the fiber was cleaved. FIG. 4 orients the viewer with respect to + or − angle changes.

In FIG. 12, the hackle zone in the lower right portion of the figure is larger than the upper (left) hackle zone. The lower mist zone extends into the core diameter. These defects are caused by an angular deviation in a +ø direction which is bending the connector end of the fiber up. This bending increases the tensional force at the bottom side of the fiber which in turn enlarges the lower hackle and mist zones. This misalignment is corrected by lowering the connector block at the connector end using the two "Y" axis screws 107 located on both sides of the fiber connector assembly 101. Rotating both screws 107 about a sixteenth of a turn counter-clockwise eliminates this problem. If the upper hackle zone were larger, then the opposite angular deviation has occurred and the corrective action requires the opposite adjustments.

After each incremental adjustment, the fiber is recleaved and reevaluated. Once the fiber is aligned, the pressure wave, hackel and mist patterns produced are symmetrical. Once the "V" grooves have been aligned to be parallel in the "Y" axis, the "V" grooves are then aligned in the "X" axis. Alignment in the "X" axis requires a <−1.0°ø angle in order to apply a higher tensional stress at the fracture origin. The added stress helps to initiate the cleave. However, because the angle is small, the stress created by this angle returns to near normal as the cleave propagates through the fiber. Thus, the added tension provided by the angle must be such that it does not exceed the tension force provided by the chuck internal spring. Otherwise, the force applied to the side of the fiber opposite the scribe becomes compressional and causes a severe hackle to form across the fiber face. The severe hackle can also be caused by too much spring tension or by a scribe that is not sufficiently deep. It is important to note that when a severe hackle is observed, only one parameter should be changed at a time. Then, by observing changes in the fiber face, it is possible to determine whether the adjusted parameter was the parameter that was misaligned. Specifically, one of the parameters should be incrimentally changed until no further improvement is noted and two consecutive adjustments produce identical results. Table 3 provides a summary of some of the symptoms of a poor fiber cleave and how the device can be adjusted to improve cleaving results.

TABLE 3

| SYMPTOM | FAULT/CORRECTION |
|---|---|
| Severe hackle across fiber | Chuck internal spring tension too high.<br>7. Loosen adjustment screw lock nut 142 and turn spring adjustment screw knob 143 counter-clockwise one turn, cleave and evaluate fiber face.<br>Scribe not deep enough.<br>8. Adjust scribe head spring tension according to step (4) of trouble shooting.<br>"X" axis ø angle too large.<br>9. Very small adjustments to the "X" axis adjustment screws 106 located at the connector end of the connector block 103. Turn the screw on the fiber connector clamp 105 side of the connector block 103 clockwise ≈ 1/16 of a turn. Turn the screw on the opposite side of the connector block 103 counter-clockwise ≈ 1/16 of a turn. |

Note: It will take several iterations of steps 7, 8 and 9 to correct this problem.

Figure 14:
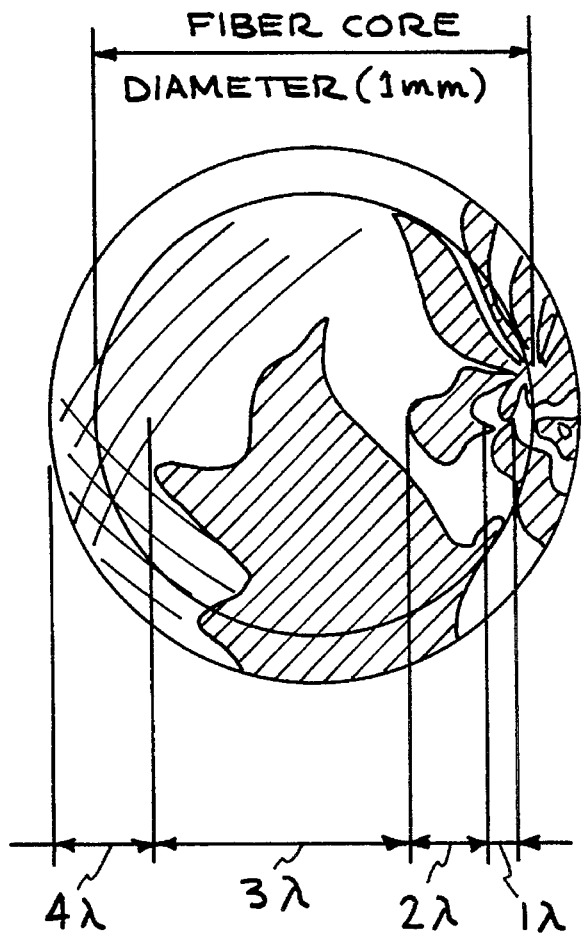
FIG. 14 depicts the video print of the fiber in FIG. 13 using a NRC fiber interferometer which produces a topographical map where the width of a light and dark area combined is equal to a surface change of one wavelength of light, (0.78 µm)

FIG. 13 depicts an image of a cleaved fiber. FIG. 14 depicts a video print of the fiber in FIG. 13. The surface quality of this cleave is the exception rather than the rule. The video print was taken on an NRC fiber interferometer at a wavelength of 0.780 microns. The interferometer is of the Michaelson type which incorporates a diode laser, pellicle beamsplitter and an interference filter plate. The fiber is used as a mirror placed at the coherence length of the laser.

Fifty percent of the laser light is reflected off of the pellicle towards the filter and four percent of the reflected light is reflected back towards the camera. The other fifty percent is transmitted through the pellicle with four percent being reflected back towards the pellicle from the fiber face. The combined reflected light from the fiber and the filter are directed towards the CCD camera. Any phase difference between the two reflections results in constructive and destructive interference (Light and Dark fringes). In the case of a perfectly flat fiber at a slight angle, the fringes will appear as stripes across the fiber face. As the fiber is tilted closer to normal angle of incidence, the fringes become larger and fewer until the interference pattern of the fiber is all light or dark. Since cleaved fibers are not perfectly flat, dark and light fringes follow a curved pattern, not unlike a contour map.

FIG. 14 provides a video print that shows this phase relation between fiber face and reference filter. The lines drawn on the print indicate a 360° phase shift or one wavelength of light (0.780 microns). If you count the number of 360° phase shifts, you find <4 across the "worst case" axis of the fiber core. 4×0.780 microns=<3.12 microns reflected wavefront error. Wavefront error refers to the phase shift of light rays reflected off of the fiber face.

The term wavefront error is important when determining the actual surface contour. Wavefront error refers to the phase shift of light rays reflected off of the fiber surface. Measurement of the amount of reflected light provides a method for measuring wavefront error. A reflection phase error is actually twice the actual contour because the light makes a roundtrip. In the case of the fiber depicted in FIG. 14, 3.12 microns indicates a 1.56 microns surface error across the fiber face. That surface is relatively flat for a broken piece of glass. Typically, fibers cleaved with this device have surface quality of 15 to 30 waves reflected wavefront error, a factor 5 to 10 worse than FIG. 14 fiber. If one compares the scribe lengths of the fibers depicted in FIGS. 12 and 13, one notices that the fiber depicted in FIG. 13 has a longer scribe than the fiber depicted in FIG. 12. In addition, the hackle zones are smaller in the fiber depicted in FIG. 13 and the mirror zone is much larger. It is believed that the reduced hackle zones and larger mirror zone is due to an increase in the scribe length. Thus, by scribing the fiber over a larger angle of the fiber's circumference, it should be possible to get the mirror surface to extend across the entire core area. The end result is a flatter surface free of hackle and mist and less susceptible to chipping and cracking when impacted.

FIGS. 15A–15D depict a scribe device that scribes the fiber over a large angle of the fiber's circumference. The scribe device is bolted directly to the fiber connector block 103 between the connector block "V" groove 104 and the chuck assembly. The fiber is inserted through the fiber connector block 103 and passes through the hole in the scribe wheel 162 and is clamped in the chuck assembly 112. The scribe wheel 162 is rotated using a thumb. The pin 159 contacts the cam 157 and allows the scribe arm 163 to rotate at the free flex pivot 164. The free flex pivot 164 (Lucas Aerospace PN 5006-800) provides both the pivotal axis of the arm and the spring pressure needed to scribe the fiber.

Figure 15A:
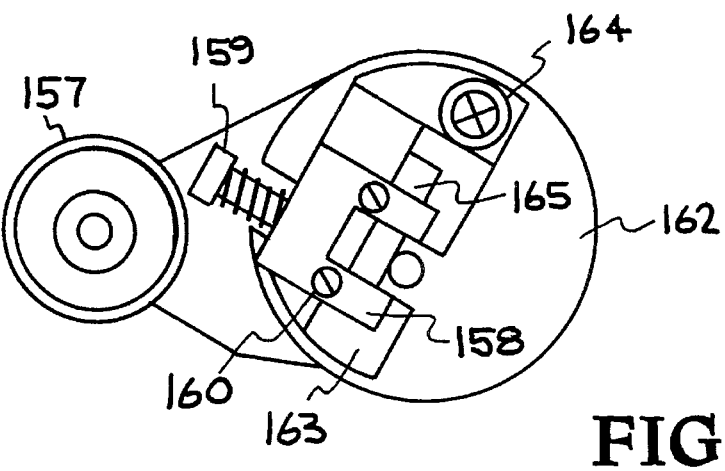
FIGS. 15A–15D depict a scribe device that scribes the fiber over a large angle of the fiber's circumference.
Figure 15B:
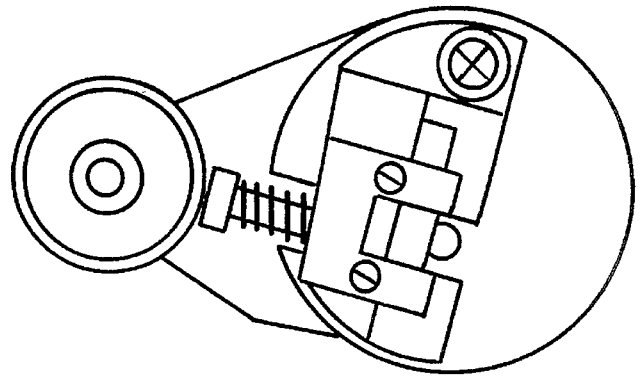
Figure 15C:
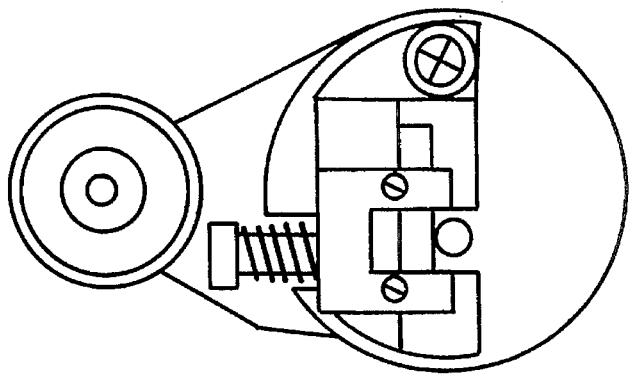
Figure 15D:
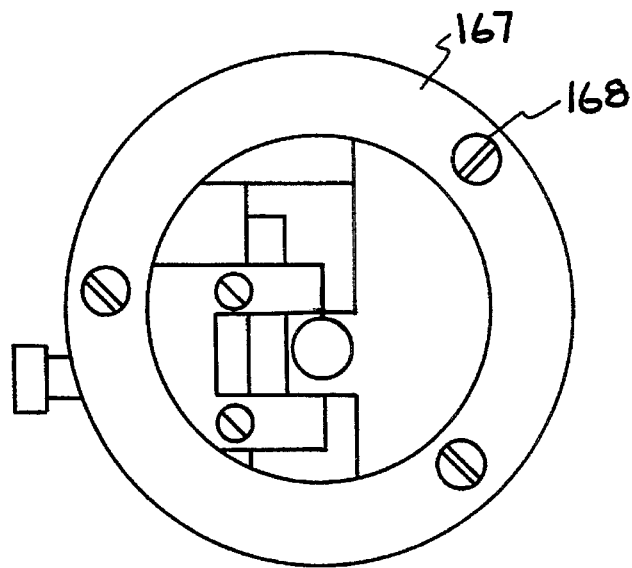

The scribe arm 163 rotates about the free flex pivot 164 until the polycrystalline diamond cutter 165 contacts the fiber. The cutter 165 remains in contact with the fiber while the scribe wheel 162 is rotated until the pin 159 reaches the opposing side of the cam 157 and pulls the arm 163 away from the fiber. The end result is a scribe covering ≈40° of the circumference of the fiber. Using this scribing device, fiber surfaces exhibiting 5 to 10 waves of error over the core diameter have been achieved. The actuation of this device is bi-directional, meaning that the device can be rotated in either direction with similar test results. FIGS. 15 A, B and C show the rotation of the arm 163 as the scribe wheel 162 is rotated. FIG. 15D depicts the cover of the scribe device which is designed to prevent damage to the free flex pivot 164 caused by excessive axial overloading. The pivot spring rate is very low (1–2 oz. total spring tension against the fiber) and can be damaged if your thumb comes in contact with the scribe arm 163 during the scribing procedure.

Once the connector assembly has been properly aligned, the scribe assembly spring is adjusted to insure an optimal cut size and depth. The scriber tension is first set at a high tension using the scribe tension adjusting means. The scriber tension is then incrementally reduced as the resulting fiber cleaves are evaluated. It has been determined that a reduced scriber tension is need to effect the desired cleave if the fiber is scribed over a greater angular distance of the fiber's circumference. Lower scriber tension is preferred because the device requires less frequent adjustment of the scriber tensioning means at lower scriber tensions. In addition, the lifetime of the diamond used in the scribe assembly is increased. It is therefore preferred that the fiber be scribed over at least 15° of the angular circumference of the fiber. Once the scribe assembly has been adjusted, the scriber can be used to scribe numerous fibers without requiring further adjustment. Assuming the device has been properly adjusted, the resulting cleaved fiber generally possesses a flat, perpendicular high quality face.

IV. THERMAL PROFILE COMPARISON OF CLEAVED AND POLISHED FIBERS

Figure 16A:
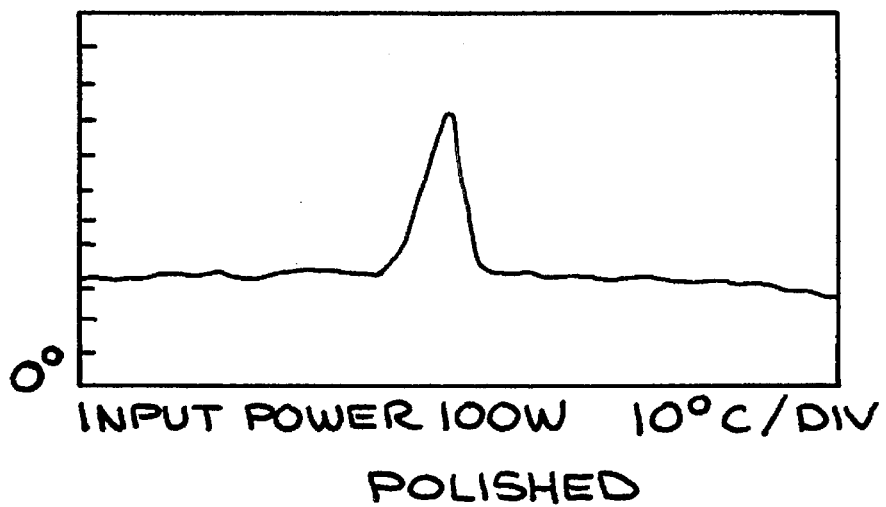
FIGS. 16A–16D depict the comparison of a cleaved fiber to a polished fiber with respect to light absorption.
Figure 16B:
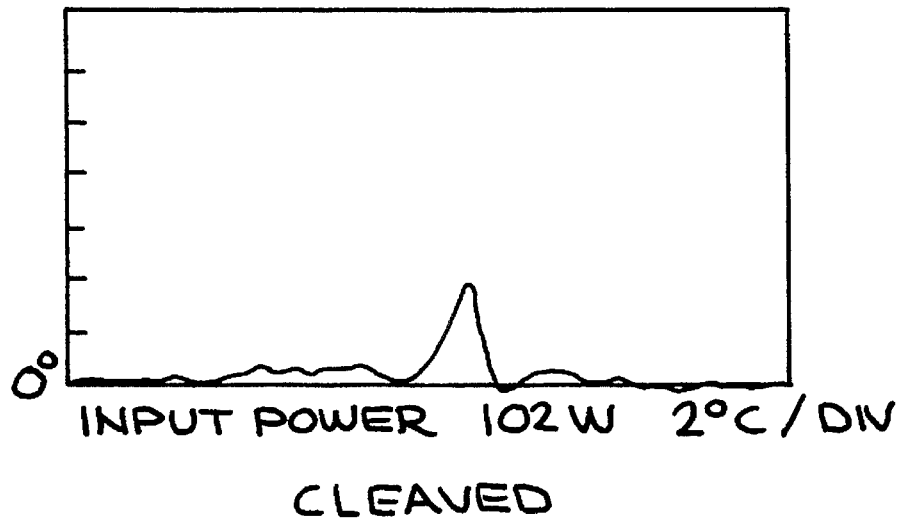
Figure 16D:
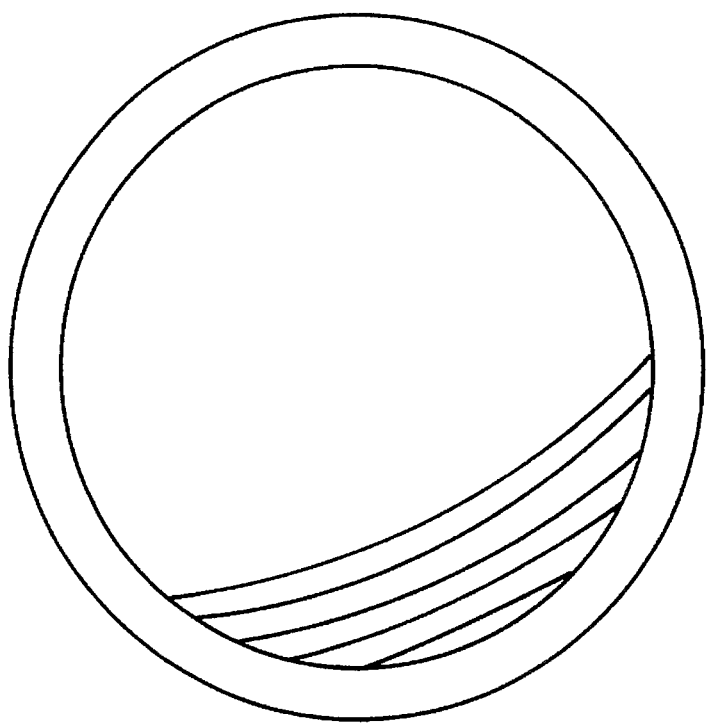
Figure 16C:
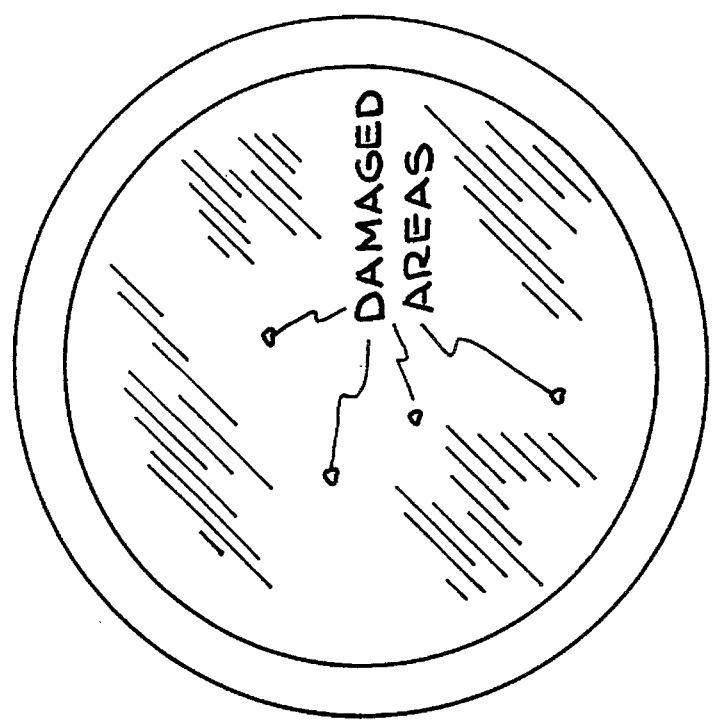

Thermal absorption profiles using a thermal imaging camera, of a polished fiber and a fiber cleaved with the device of the present invention were compared in order to evaluate the relative damage thresholds of fibers prepared by polishing and by cleavage with the device of the present invention. FIG. 16 depicts the relative temperature rise above the ambient temperature (denoted as zero on the plots) for each fiber during laser light illumination. FIG. 16A corresponds to a polished fiber and shows a 38° C. higher temperature than the cleaved fiber (FIG. 16C) for input power levels of 100 W and 102 W respectively. This result indicates that the cleaved fiber prepared by the device and method of the present invention possesses a higher damage threshold surface than the fiber prepared by polishing. A picture of the polished and cleaved fibers tested are depicted in FIGS. 16C and 16D respectively.

While the invention of this patent application is disclosed by reference to the aforementioned examples, it is to be understood that these examples are intended in an illustrative rather than a limiting sense, as it is contemplated that modifications will readily occur to those skilled in the art, within the spirit of the invention and the scope of the appended claims.

What is claimed is:

1. A device for cleaving optical fibers comprising:
   a scribing means for scribing an optical fiber, said scribing means comprising a scribe tension means for adjusting the tension of the scribing means against the fiber;
   a chuck assembly comprising:
     a chuck block wherein said chuck block further comprises a linear slot;
     a chuck positioned within said slot for movement along said slot from a loaded to an unloaded position, said chuck comprising a first holding means for holding an optical fiber within the chuck during scribing and cleaving;
     a biassing means for moving said chuck along said slot from the loaded position to the unloaded position; and
     a latch for holding the chuck in the loaded position; and
   a fiber connector block for holding the optical fiber during scribing and cleaving, said fiber connector block further comprising spacial adjustment means for aligning the fiber with the scribing means and the chuck assembly in the x, y and phi directions.

2. A device according to claim 1 wherein the biassing means is a compression spring.

* * * * *